(12) United States Patent
Saulpaugh et al.

(10) Patent No.: US 6,934,755 B1
(45) Date of Patent: Aug. 23, 2005

(54) SYSTEM AND METHOD FOR MIGRATING PROCESSES ON A NETWORK

(75) Inventors: Thomas E. Saulpaugh, San Jose, CA (US); Gregory L. Slaughter, Palo Alto, CA (US); Robert Rodriguez, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 734 days.

(21) Appl. No.: 09/587,113

(22) Filed: Jun. 2, 2000

(51) Int. Cl.$^7$ ............................................. G06F 15/173
(52) U.S. Cl. ........................ 709/226; 709/225; 718/106
(58) Field of Search ................................ 709/225, 226; 718/104–106

(56) References Cited

U.S. PATENT DOCUMENTS

| | | | |
|---|---|---|---|
| 4,742,447 A | 5/1988 | Duvall et al. | |
| 4,843,541 A | 6/1989 | Bean et al. | |
| 4,989,131 A | 1/1991 | Stone | |

(Continued)

FOREIGN PATENT DOCUMENTS

| | | |
|---|---|---|
| EP | 300 516 | 1/1989 |
| EP | 330 087 | 8/1989 |
| EP | 351 536 | 1/1990 |

(Continued)

OTHER PUBLICATIONS

"Verteilte Systeme," Michael Weber, HTb, Spektrum Akademischer Verlag, 1998.
Correspondence from the International Preliminary Examination Authority for PCT/US01/16818, mailed Oct. 15, 2002, 3 pages.

(Continued)

*Primary Examiner*—Jack B. Harvey
*Assistant Examiner*—Scott M. Collins
(74) *Attorney, Agent, or Firm*—Robert C. Kowert; Meyertons, Hood, Kivlin, Kowert & Goetzel, P.C.

(57) ABSTRACT

A method and system is provided for migrating processes from one virtual machine to another on a network. To migrate the external state of a process, the process may use a network service connection system or a compact network service connection system for accessing resources external to the virtual machine. A process may be migratable separately from other processes. A process may have an in-memory heap used for the execution of the process, a virtual heap that may include the entire heap of the process including at least a portion of the runtime environment, and a persistent heap where the virtual heap may be checkpointed. In one embodiment, the virtual heap may serve as the persistent heap. In another embodiment, the virtual heap may be checkpointed to a separate, distinct persistent heap. The combination of the in-memory heap, the virtual heap, and the persistent store may be referred to as a virtual persistent heap. One embodiment of a method for migrating an application may include checkpointing the application to a persistent heap. Current leases to local and/or remote resources may be expired. The persistent state of the process may be packaged in the persistent heap and sent to the node where the process is to migrate. A transaction mechanism may be used, where the process's persistent state is copied and committed as having migrated on both the sending and receiving nodes. The state of the process may then be reconstituted into a new virtual persistent heap on the node where the application migrated. Leases to local and/or remote resources for the process may be re-established. The process may then resume execution on the node where it migrated. In one embodiment, a versioning mechanism may be used whereby nodes where a process once lived may cache a previous state. In addition, a user interface (UI) may be provided to manage process checkpoints.

55 Claims, 19 Drawing Sheets

U.S. PATENT DOCUMENTS

| | | | |
|---|---|---|---|
| 5,341,484 A | | 8/1994 | Tanaka et al. |
| 5,390,334 A | | 2/1995 | Harrison |
| 5,682,535 A | | 10/1997 | Knudsen |
| 5,692,192 A | * | 11/1997 | Sudo .......................... 718/105 |
| 5,751,613 A | | 5/1998 | Doty et al. |
| 5,778,187 A | | 7/1998 | Monteiro et al. |
| 5,778,443 A | | 7/1998 | Swanberg et al. |
| 5,802,267 A | | 9/1998 | Shirakihara et al. |
| 5,822,590 A | | 10/1998 | Gupta |
| 5,832,529 A | * | 11/1998 | Wollrath et al. ............ 707/206 |
| 5,860,083 A | | 1/1999 | Sukegawa |
| 5,966,702 A | | 10/1999 | Fresko et al. |
| 6,016,500 A | | 1/2000 | Waldo et al. |
| 6,070,173 A | | 5/2000 | Huber et al. |
| 6,094,528 A | | 7/2000 | Jordan |
| 6,178,519 B1 | | 1/2001 | Tucker |
| 6,256,637 B1 | | 7/2001 | Venkatesh et al. |
| 6,301,582 B1 | | 10/2001 | Johnson et al. |
| 6,345,276 B1 | | 2/2002 | Lee |
| 6,421,739 B1 | | 7/2002 | Holiday |
| 6,480,862 B1 | | 11/2002 | Gall |
| 6,622,263 B1 | | 9/2003 | Stiffler et al. |
| 6,629,113 B1 | | 9/2003 | Lawrence |
| 6,694,346 B1 | | 2/2004 | Aman et al. |
| 6,760,815 B1 | | 7/2004 | Traversat et al. |
| 6,763,440 B1 | | 7/2004 | Traversat et al. |

FOREIGN PATENT DOCUMENTS

| | | |
|---|---|---|
| EP | 384 339 | 8/1990 |
| EP | 403 124 | 12/1990 |
| EP | 472 874 | 3/1992 |
| EP | 474 340 | 3/1992 |
| EP | 483 525 | 5/1992 |
| EP | 497 022 | 8/1992 |
| EP | 555 997 | 8/1993 |
| EP | 565 849 | 10/1993 |
| EP | 569 195 | 11/1993 |
| EP | 625 750 | 11/1994 |
| EP | 651 328 | 5/1995 |
| EP | 660 231 | 6/1995 |
| EP | 697 655 | 2/1996 |
| EP | 718 761 | 6/1996 |
| EP | 767 432 | 4/1997 |
| EP | 778 520 | 6/1997 |
| EP | 794 493 | 9/1997 |
| EP | 803 810 | 10/1997 |
| EP | 803 811 | 10/1997 |
| EP | 805 393 | 11/1997 |
| EP | 810 524 | 12/1997 |
| EP | 817 020 | 1/1998 |
| EP | 817 022 | 1/1998 |
| EP | 817 025 | 1/1998 |
| EP | 836 140 | 4/1998 |
| GB | 2 253 079 | 8/1992 |
| GB | 2 262 825 | 6/1993 |
| GB | 2 305 087 | 3/1997 |
| JP | 11-45187 | 10/1997 |
| WO | 92/07335 | 4/1992 |
| WO | 93/25962 | 12/1993 |
| WO | 94/03855 | 2/1994 |
| WO | 96/03692 | 2/1996 |
| WO | 96/10787 | 4/1996 |
| WO | 96/18947 | 6/1996 |
| WO | 96/24099 | 8/1996 |
| WO | 98/02814 | 1/1998 |
| WO | 98/04971 | 2/1998 |

OTHER PUBLICATIONS

"Java ™ Remote Method Invocation Specification," Sun Microsystems, Inc., <java.sun.com/products/dk1.2beta1>, 1997.

Agha, et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed, et al., "A Program Building Tool for Parallel Applications," Yale University, pp. 1–23, Dec. 1, 1993.

Aldrich, et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich, et al., "Providing Easier Access to Remote Objects in Distributed Systems," Calif. Institute of Technology, www.cs.Caltech.edu/%7Ejedi/paper.html, Nov. 21, 1997.

Anderson, et al., "Persistent Linda: Linda + Transactions + Query Processing," Proceedings of the 13$^{th}$ Symposium on Fault Tolerant Systems, pp. 93–109, 1991.

"Transparent Network Computing," Locus Computing Corporation, Jan. 5, 1995.

Alexander, et al., "Active Bridging," Proceedings of the ACM/SIGCOMM'97 Conference, Cannes, France, Sep. 1997.

Beech, et al., "Object Databases as Generalizations of Relational Databases," Computer Standards & Interfaces, vol. 13, Nos. 1/3, pp. 221–230, Amsterdam, NL, Jan. 1991.

Bertino, et al., Object–Oriented Database Management Systems: Concepts and issues,: Computer, vol. 24, No. 4, pp. 33–47, Los Alamitos, CA, Apr. 1991.

Betz, et al., "Interoperable Objects: Laying the Foundation for Distributed Object Computing," Dr. Dobb's Journal, vol. 1, No. 11, p. 18(13), Oct. 1994.

Bevan, et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell, et al., "Distributed Garbage Collection for Network Objects," Digital Systems, Research Center, No. 116, pp. 1–18, Dec. 15, 1993.

Birrell, et al., "Grapevine: An Exercise in Distributed Computing," Communications of the ACM, vol. 25, No. 4, pp. 260–274, Apr. 1982.

Birrell, et al., "Network Objects," DEC SRC Research Report 115, Feb. 28, 1994.

Birrell, et al., "Implementing Remote Procedure Calls," ACM Transactions on Computer Systems, vol. 2, No. 1, pp. 39–59, Feb. 1984.

Birrell, et al., "Network Objects," Operating Systems Review, 27(5), pp. 217–230, Dec. 1993.

Cannon, et al., "Adding Fault–Tolerant Transaction Processing to Linda," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero, et al., "Distributed Data Structures in Linda," Principles of Programming Language, pp. 1–16, 1986.

Carriero, et al., "Distributed Data Structures in Linda," Yale Research Report YALEU/DCS/RR–438, Nov. 1985.

Chung, et al., "A Tiny' Pascal Compiler: Part 1: The P–Code Interpreter," BYTE Publications, Inc., Sep. 1978.

Chung, et al., "A Tiny' Pascal Compiler: Part 2: The P–Compiler," BYTE Publications, Inc., Oct. 1978.

Dave, et al., "Proxies, Application Interface, And Distributed Systems," Proceedings International Workshop On Object Orientation In Operating Systems, pp. 212–220, Sep. 24, 1992.

Deux, et al., "The O2 System," Communications Of The Association For Computing Machinery, Col. 34, No. 10, pp. 34–48, Oct. 1, 1991.

Dijkstra, "Self-stabilizing Systems, in Spite of Distributed Control," Communications of the ACM, vol. 17, No. 11, pp. 643–644, Nov. 1974.

Dolev, et al., "On the Minimal Synchronism Needed for Distributed Consensus," Journal of the ACM, vol. 34, No. 1, pp. 77–97, Jan. 1987.

Dollimore, et al., "The design of a System for Distributing Shared Objects," The Computer Journal, No. 6, Cambridge, GB, Dec. 1991.

Dourish, "A Divergence–Based Model of Synchrony and Distribution in Collaborative Systems," Xerox Technical Report EPC–1194–102, pp. 1–10, 1994.

Drexier, et al., "Incentive Engineering for Computational Resource Management," The Ecology of Computation, Elsevier Science Publishers B.V., pp. 231–266, 1988.

Gelernter, et al., "Parallel Programming in Linda," Yale University, pp. 1–21, Jan. 1995.

Droms, "RFC 1541 Dynamic Host Configuration Protocol," <http://www.cis.ohio-state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1997.

Fleisch, et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gelernter, "Generative Communication in Linda," ACM Transactions On Programming Languages and Systems, vol. 7 No. 1, pp. 80–112, Jan. 1985.

Gottlob, et al., "Extending Object–Oriented Systems with Roles," ACM Transactions On Information Systems, vol. 14, No. 3, pp. 268–296, Jul. 1996.

Gray, et al., "Leases: An Efficient Fault–Tolerant Mechanism for Distributed File Cache Consistency," ACM, pp. 202–210, 1989.

Guth, "JavaOne: Sun to Expand Java Distriubted Computing Effort," <http://www.sunworld.com/swol–02–1998/swol–02–sunspots.html>, XP–002109935, p. 1, Feb. 20, 1998.

Guyennet, et al., "A New Consistency Protocol Implemented in the CaliF System," IEEE, 1094–7256/97, pp. 82–87, 1997.

Guyennet, et al., "Distributed Shared Memory Layer for Cooperative Work Applications," IEEE, 0742–1303/97, pp. 72–78, 1997.

Hamilton, et al., "Subcontract: A Flexible Base For Distributed Programming," Proceedings of 14$^{th}$ Symposium of Operating System Principles, Dec. 1993.

Hamilton, "Java and the Shift to Net–Centric Computing," Computers, pp. 31–39, Aug. 1996.

Harris, et al., "Proposal for a General Java Proxy Class for Distributed Systems, and Other Uses," Netscape Communications Corp., Jun. 25, 1997.

Hartman, et al., "Liquid Software: A New Paradigm For Networked Systems," Technical Report 96–11, Dept. of Comp. Sci., Univ. of Arizona, Jun. 1996.

Howard, et al., "Scale and Performance in a Distributed File System," ACM Transactions on Computer Systems, vol. 6, No. 1, pp. 51–81, Feb. 1988.

Pier, "A Retrospective on the Dorando, A High–Performance Personal Computer," Xerox Corporation, Aug. 1983.

Pinakis, "Using Linda as the Basis of an Operating System Microkernel," University of Western Australia, Dept. of Computer Science, pp. 1–165, Aug. 1993.

Riggs, et al., "Picking State in the Java ™ System," USENIX Association Conference on Object–Oriented Technologies and Systems, CP–002112719, pp. 241–250, Jun. 17–21, 1996.

Rosenberry, et al., "Understanding DCE," Chapters 1–3, 6, 1992.

Sharrott, et al., "ObjectMap: Integrating High Performance Resources into a Distributed Object–oriented Environment," ICODP, 1995.

Stevenson, "Token–Based Consistency of Replicated Servers," IEEE, CH2686–4/89/0000/0179, pp. 179–183, 1989.

Thompson, "Regular Expression Search Algorithm," Communications of the ACM, vol. II, No. 6, p. 149 et seq., Jun. 1968.

Venners, "Jini Technology Out of the Box," JAVAWORLD, 'Online!, pp. 1–4, Dec. 1998.

Waldo, et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson, et al., "Design of the Opportunistic Garbage Collector," Proceedings of the Object Oriented Programming Systems, Languages And Applications Conference, New Orleans, vol. 24, No. 10, Oct. 1989.

Wollrath, et al., "A Distributed Object Model for the Java ™ System," USENIX Association, Conference on Object–Oriented Technologies and Systems, Jun. 17–21, 1996.

Wu, "A Type System For An Object–Oriented Database System," Proceedings of the International Computer Software and Applications Conference (COMPSAC), Tokyo, Japan, pp. 333–338, Sep. 11–13, 1991.

Yemini, et al., "Towards Programmable Networks," IFIP/IEEE International Workshop on Distributed Systems: Operations and Management, L'Aquila, Italy, Oct. 1996.

Yin, et al., "Using Leases to Support Server Driven Consistency in Large–Scale Systems," Computer Services Department, University of Texas at Austin, p. 285–294, May 26–28, 1998.

Yin, et al., "Volume Leases for Consistency in Large–Scale Systems," IEEE Transactions on Knowledge & Data Engineering, vol. 11, No. 4, pp. 563–576, Jul./Aug. 1999.

Mitchell, et al., "An Overview of the Spring System," Feb. 1994.

Mitchell, et al., "Mesa Language Manual," Xerox Corporation, Palo Alto Research Center, 1978.

McDaniel, "An Analysis of a Mesa Instruction Set," Xerox Corporation, May 1982.

McGrath, "Discovery and Its Discontents: Discovery Protocols for Ubiquitous Computing," Presented at Center for Excellence in Space Data and Information Science NASA Goddard Space Flight Center, Apr. 5, 2000.

Mummert, et al., "Long Term Distributed File Reference Tracing: Implementation and Experience," Carnegie Mellon University School of Computer Science, pp. 1–28, Nov. 1994.

Orfali, et al., "The Essential Distributed Objects Survival Guide," Chapter 11: Corba Commercial ORBs, pp. 203–215, John Wiley & Sons, Inc., 1996.

Ousterhout, et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1993.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM ™ Technical Disclosure Bulletin, "Object Location Algorithm," vol. 36, No. 09B, pp. 257–258, Sep. 1993.

IBM, "Chapter 6—Distributed SOM (DSOM)," SOMobjects Developer Toolkit Users Guide, Version 2.1, pp. 6-1-6-90, Oct. 1994.

Anonymous, "Change–Notification Service for Shared Filed," IBM Technical Disclosure Bulletin, vol. 36, No. 8, pp. 77–82, XP002109435, New York, US, Nov. 1973.

IBM ™ Technical Disclosure Bulletin, "Retrieval of Qualified Variables Using Extendible Hashing," vol. 36, No. 12, pp. 301–303, Dec. 1993.

Anonymous, "Resource Preemption for Priority Scheduling," IBM Technical Disclosure Bulletin, vol. 16, No. 6, p. 1931, XP002109435 New York, US, Nov. 1973.

IBM ™ Technical Disclosure Bulletin, "Local Network Monitoring to Populate Access Agent Directory," vol. 36, No. 09A, pp. 403*405, Sep. 1993.

MUX–Elektronik, Java 1.1 Interactive Course, www.lls.se/~mux/javaic.html, 1995.

Jones, et al., "Garbage Collection: Algorithms for Automatic Dynamic Memory Management," pp. 165–175, John Wiley & Sons, 1996.

Kambhatla, et al., "Recovery with Limited Replay: Fault–Tolerant Processes in Linda," Oregon Graduate Institute, Technical Report CSIE 90–019, pp. 1–16, Sep. 1990.

Kay, et al., "An Overview of the Raleigh Object–Oriented Database System," ICL Technical Journal, vol. 7, No. 4, pp. 780–798, Oxford, GB, Nov. 1991.

Kougiouris, et al., "Support for Space Efficient Object Invocation in Spring," Sep. 1994.

Krasner, "The Smalltalk–80 Virtual Machine," BYTE Publications Inc., pp. 300–320, Aug. 1991.

Lamport, et al., "The Byzantine Generals Problem," ACM Transactions on Programming Languages and Systems, vol. 4, No. 3, pp. 382–401, Jul. 1982.

Linda Database Search, pp. 1–68, Jul. 20, 1995.

Liskov, et al., "Distributed Object Managment in Thor," International Workshop on Distributed Object Management, p. 12, 1992.

Gosling, et al., "The Java ™ Language Specification," Addison–Wesley, 1996.

Jaworski, "Java 1.1 Developer's Guide, 2nd Edition," Sams.net, 1997.

Coulouris, et al., "Distributed Systems Concepts and Designs," Second Edition, Addison–Wesley, 1994.

Mullender, "Distributed Systems," Second Edition, Addison–Wesley, 1993.

Lindholm, et al., "The Java ™ Virtual Machine Specification," Addison Wesley, 1996.

"SOAP: Simple Object Access Protocol," msdn online Web Workshop, Microsoft, Apr. 26, 2000, http://msdn.Microsoft.com/xml/general/soapspec.asp, 34 pages.

Rob Guth, "Sun tries on JacaSpaces for Distributed OS," Aug. 1997, vol. 19, Issue 34, 2 pages.

Microsoft, "Microsoft.NET: Realizing the Next Generation Internet," A Microsoft White Paper, Jun. 2000, 8 pages.

K. F. Eustice, et al., "A Universal Information Appliance," IBM Systems Journal, vol. 38, No. 4, 1999, pp. 575–601.

Wycoff, et al., "T Spaces," IBM Systems Journal, vol. 37, No. 3–Java Technology, Aug. 1998, 36 pages.

Steve Morgan, "Jini to the Rescue," IEEE Spectrum, Apr. 2000, vol. 37, No. 4, 8 pages.

Randy Kath, "The Virtual–Memory Manager in Windows NT," Microsoft Developer Network Technology Group, Dec. 21, 1992, 12 pages.

Murali R. Krishnan, "Heap: Pleasures and Pains," Microsoft Corporation, Feb. 1999, 6 pages.

Randy Kath, "Managing Memory–Mapped Files in Win32," Microsoft Developer Network Technology Group, Feb. 9, 1993, 9 pages.

Randy Kath, Managing Heap Memory in Win32, Microsoft Developer Network Technology Group, Apr. 3, 1993 10 pages.

Lacapra, et al., "The Virtual Memory Scheme of Cosmos," XP000856970, Jan. 6, 1992, pp. 43–51.

"SourceForge.net: user–mode–linux–user," Internet Document, Dec. 1999, XP002215321, retrieved from http://sourceforge.net/mailarchive/forum.php?forum_id=3647&max_rows=100&style=nested&viewmonth=199912, 10 pages.

Art Greenberg, "Re: Flash Memory Based System," Internet Document, Online!, Jan. 26, 1998, XP–002215323, 1 page.

Daniel Quinlan, "PCI NVRAM Card for Linux?," Internet Document, Online!, Mar. 24, 1999, XP–002215322, 1 page.

Artosz Klimek, "Re: Against Virtual Memory," Internet Document, Online!, Aug. 9, 1999, XP–002215324, 1 page.

Fayzulling, "ColEm–DOS: The Portable Coleco Vision Emulator," version 1.0a, Oct. 27, 1998, XP002227792, 3 pages.

Perret, et al., "Mobile Assistant Programming for Efficient Information Access on the WWW," Computer Networks and ISDN Systems, 1996 Published by Elsevier Science B.V., 11 pages.

Wang, et al., "Checkpointing and Its Applications," IEEE, published Jun. 27, 1995, XP000597774, pp. 22–31.

* cited by examiner

SYSTEM AND METHOD FOR MIGRATING PROCESSES ON A NETWORK

BACKGROUND OF THE INVENTION

1. Field of the Invention

The present invention relates to the field of network computing, and more particularly to a system and method for migrating running Java™ and other applications from one machine to another on a network.

2. Description of the Related Art

The problem of migrating a running process, for example, an application, from one machine to another on a network has been tried for years, and there is much research literature on the subject of "process migration," but not much success in actually solving this difficult problem.

Currently, with the world moving towards a network centric model of computing, with unprecedented connectivity, there is a growing need to run an application (editor, email, browser, etc.) on one computer, and to be able to later resume running that same application from another machine in another location. Such a need can only be fulfilled via application migration. At the same time, modern operating systems have become very complex, and tend to have multiple applications running on a very thick client, and this complexity has resulted in much unreliability. It's thus desirable to be able to separate an application from the rest of the complex operating system, and persist it somewhere on the net, where it is protected from the complex, thick client system. This need, as well, can only be fulfilled via persistent application migration.

Java™

The computer world currently has many platforms, among them Microsoft Windows®, Apple Macintosh®, OS/2, UNIX®, Linux and NetWare®. Software must be compiled separately to run on each platform. The binary file for an application that runs on one platform cannot run on another platform, because the binary file is platform-specific.

A "virtual machine" may be defined as an operating environment that sits on top of one or more other computer platforms, and provides the capability to run one binary file on the virtual machine on the one or more other computer platforms. Thus, an application is written and compiled to run on the virtual machine, and thus does not need to be compiled separately to run on the one or more other computer platforms.

The Java Platform is a software platform for delivering and running applets and applications on networked computer systems. What sets the Java Platform apart is that it sits on top of other platforms, and executes bytecodes, which are not specific to any physical machine, but are machine instructions for a virtual machine. A program written in the Java Language compiles to a bytecode file that can run wherever the Java Platform is present, on any underlying operating system. In other words, the same file can run on any operating system that is running the Java Platform. The Java Platform has two basic parts, the Java Virtual Machine and the Java Application Programming Interface (Java API).

The Sun Java technologies are grouped into three editions: Java 2 Micro (J2ME), Standard (J2SE), and Enterprise (J2EE) Editions. Each edition includes a Java Virtual Machine (JVM) that fits inside a range of consumer devices such as set-top, screenphone, wireless, car, and digital assistant devices J2ME specifically addresses the consumer space, which covers the range of small devices from smart cards and pagers up to the set-top box, an appliance almost as powerful as a computer. The consumer devices targeted by J2ME, such as set-top boxes, printers, copiers, and cellular phones, typically have fewer resources and more specialized functionality than a typical Network Computer. Such devices may have special constraints such as small memory footprint, no display, or no connection to a network. The J2ME API provides the smallest Java API one of these limited devices can have and still run. A Java-powered application written for one particular device may operate on a wide range of similar devices. Applications written with J2ME are upwardly scalable to work with J2SE and J2EE.

Java Remote Method Invocation (RMI)

RMI is a Java programming language-enabled extension to traditional remote procedure call mechanisms. RMI allows not only data to be passed from object to object around the network but full objects, including code.

K Virtual Machine (KVM)

The K Virtual Machine (KVM) is a Java runtime environment that is an extremely lean implementation of the Java virtual machine for use in devices that have a small memory footprint. The KVM is the core of the Java 2 Micro Edition (J2ME). The KVM is suitable for 16/32-bit RISC/CISC microcontrollers with a total memory of no more than a few hundreds of kilobytes (Kbytes) and sometimes less than 128 Kbytes of RAM. This typically applies to small-footprint memory devices, including digital cellular phones, pagers, mainstream personal digital assistants, low-end analog set-top boxes, and. small retail payment terminals.

Application Migration and Java

By writing an application in Java, the application is not tied to a particular machine, but is rather written to run on an abstract or "virtual" machine, the Java Virtual Machine (JVM). Consequently, it is possible for the application to run on any machine on the network that implements the JVM specification. This aids in process migration, because past attempts at this problem have been largely foiled by differences, even slight ones, among the various machines on a network where an application is intended to migrate and run. By itself, though, an application written in Java cannot migrate from one machine on a net to another, because once the application starts running, it runs only in the heap of the JVM on which it initially started.

The Java language provides the programmer with an object model, a strong type system, automatic main memory storage management and concurrency through lightweight threads. However, the Java platform provides no satisfactory way of maintaining these properties beyond the single execution of a JVM. Instead, the programmer must deal explicitly with saving the state of an application, using one of a variety of persistence mechanisms, for example, file input/output, object serialization or relational database connectivity, none of which approach complete support for the full computational model. This lack of completeness, while only a minor nuisance for simple applications, becomes a serious problem as application complexity increases.

Orthogonal Persistence for Java

Orthogonal persistence for the Java platform (OPJ) addresses some of the limitations of application migration with Java with no changes to the source language and minor modifications to the specification of the Java Virtual Machine life cycle. In effect, orthogonal persistence extends the automatic memory management of the Java platform to encompass stable memory.

OPJ allows a running Java application to persist with no change to the application or to Java (thus orthogonal). This is achieved by enhancements to the JVM that implement a persistent heap that parallels the heap that Java code runs in. It is possible to suspend a running application and have a checkpoint result in the persistent heap that can later be reactivated on that same JVM. However, migrating to another JVM on another machine is not supported.

Another limitation of the persistent heap and checkpointing as implemented in OPJ is that any portions of a process that are dependent upon external state and not transient may be invalid when the code runs again, because the actual external state may have changed. An example of an external state is a socket for a network connection.

Yet another limitation of the persistent heap and checkpointing as implemented in OPJ is that it supports one large persistent heap for all Java code running on the system, making it difficult to separate out one particular application to migrate to another node. The persistent heap may include system Java objects and application Java objects. System Java objects are those Java objects tied to the platform (machine and operating system) on which the JVM is executing with the Java Native Interface (JNI). System Java objects may include native methods for the platform on which the JVM is executing. The application Java objects for the particular application would have to be separated from the application Java objects from any other running process and from the system Java objects.

Still yet another limitation of the OPJ model is that it requires two separate garbage collectors, one for the "in-memory" heap and one for the persistent heap.

JVM Separation Models

In a system providing application migration, it would be desirable to separate an application so that only it runs in a heap (and is persisted in a persistent heap). One way to do this is to start a separate JVM on the machine for each application. Although simple, the approach may not be practical. For one thing, this solution uses many system resources. Other approaches for application separation are hierarchical, with one "real" JVM and many "virtual" JVMs multiplexed on top. It would be desirable to provide a virtual machine separation model that separates applications into discrete persistent stores, permits the running of applications one at a time in an in-memory heap, and that does so without requiring the running of multiple copies (real or virtual) of the JVM.

SUMMARY OF THE INVENTION

The problems outlined above may be solved in large part by a system and method for persistent application migration that provides application separation and a method of maintaining the properties of a process beyond the single execution of a virtual machine such as a Java Virtual Machine (JVM) while preserving the external state of the process.

One embodiment provides for migrating pure Java applications from one machine to another on a network. Other embodiments may provide for migrating non-pure Java applications and/or non-Java applications among machines on a network or between devices when at least one of the devices may not be connected to a network. In one embodiment, in order to handle the problem of migrating the external state of an application, migratable applications may use a network service connection system such as Jini or a Compact Network Service Connection System (CNSCS) for accessing external resources, referred to as services. External resources may be those resources outside the virtual machine. Other embodiments may use other methods for accessing external resources that allow for the preservation of external state during migration.

In one embodiment, an application on a system may be separated from other applications and from system code and data, and thus migratable separately from the other applications. In one embodiment, one or more applications on a system may each have an in-memory heap serving as "physical" memory that is being used for the current execution of the application, a virtual heap that may include the entire heap of the application including at least a portion of the runtime environment, and a persistent heap or store where the virtual heap can be checkpointed. In one embodiment, the virtual heap and the persistent heap may be combined in one memory (the virtual heap may serve as the persistent heap). In another embodiment, the virtual heap may be checkpointed to a separate, distinct persistent heap. The combination of the in-memory heap, the virtual heap, and the persistent store may be referred to as the "virtual persistent heap."

A heap may include code and data for use by the application. In object-oriented programming languages such as Java, at least some of the code and data in the heap for the application may be encapsulated in objects. Objects may be defined as structures that are instances of a particular class or subclass of objects. Objects may include instances of the class's methods or procedures (code) and/or data related to the object. An object is what actually "runs" in an object-oriented program in the computer.

A heap may also include structures for managing the application's code and data in the heap. For example, a heap may be divided into sections, for example pages or cache lines. The sections of the heap may be grouped into sets of two or more sections for some heap processing functions such as garbage collection. Sections of the heap may include structures for managing code and data (objects) in the section. For example, one or more structures for tracking internal and external references to objects in a section may be kept in the sections of memory. An internal reference to an object may be defined as a reference to an object from another object in the same section of the heap. An external reference may be defined as a reference to an object from another object in another section of the heap.

In one embodiment, an application may establish one or more leases to local and/or remote services external to the application. In one embodiment, an application may establish one or more leases to system code that give the application access to resources external to the application such as system resources. System code for accessing an external resource may be referred to as a system service. A lease on system code for accessing an external resource may be referred to as a leased system service. For example, an application may establish leases to system services that give the application access to system drivers for accessing communications ports in the system.

One embodiment of a method for migrating an application may include:

Checkpointing the application to its persistent heap.

Expiring any current leases to local and/or remote services external to the application.

Expiring any current leases to system services.

Packaging the persistent state of the application in the persistent heap and sending the persistent heap for the application to the node where the application is to migrate. A transaction mechanism may be used, where the application's entire persistent state is copied atomically as a "transaction" and committed as having migrated on both the sending and receiving nodes.

Reconstituting the state of the application into a new virtual persistent heap on the node where the application migrated.

Re-establishing leases to services and/or system services for the application.

The application resuming execution in the virtual persistent heap on the node where it migrated.

In one embodiment, since processes that migrate away from a node may migrate back after minor state changes on the node where they migrated (e.g. updated a page of a document), a versioning mechanism may be used whereby nodes where an application once lived may cache a previous state, and thus may avoid sending over the network a state that hasn't changed.

In addition, a user interface (UI) may be provided to manage application checkpoints. Functions the UI may allow the user to perform may include, but are not limited to, the following:

Browse the store.

Select an application checkpoint to restart.

Suspend the current application.

Remove an application checkpoint.

Virtual Heap

In one embodiment, the virtual heap may allow the running of a process on a "physical" heap that is smaller than may otherwise be required. As an example, the virtual heap may be an order of magnitude larger than the physical, in-memory heap. In one embodiment, the virtual heap may be maintained on non-volatile memory storage external to the device running the virtual machine, and portions of the heap for the current execution state of the process may be cached in and out of a "physical" heap resident in local memory on the device. For example, the device may connect to a server on the Internet, and the server may provide non-volatile storage space for the virtual heap. In another embodiment, the external storage for the virtual heap may reside on a non-volatile storage attached to the device, for example, a Flash card or hard disk drive.

One embodiment of the present invention includes a virtual persistent heap. In a virtual persistent heap, the entire heap may be made persistent. The virtual persistent heap may enable the checkpointing of the state of the computation of the virtual machine to a persistent storage such as a disk or flash device for future resumption of the computation from the checkpoint. The Virtual Persistent Heap may enable the migration of the virtual machine computation states from one machine to another. Both the data and computation state may be migrated. One embodiment may also provide for the suspension and resumption of an application, such as upon restarting a device after an intentional or unintentional shutdown of the device. The virtual persistent heap is important for small consumer and appliance devices including Java-enabled devices, such as cellular phones and Personal Digital Assistants (PDAs), as these appliances may be shutdown and restarted often. In one embodiment, the virtual persistent heap may include the entire address space of the virtual machine heap an application is using. The virtual persistent heap may include a caching method, a database store method, and a garbage collection method as described below.

A Caching Method for the Virtual Persistent Heap

A feature of the virtual persistent heap is the method used to cache portions of the virtual persistent heap into the physical heap. In one embodiment, the virtual persistent heap may include a caching mechanism that is effective with small consumer and appliance devices that typically have a small amount of memory and that may be using flash devices as persistent storage. The caching strategy may provide a reduced amount of caching and may help to improve locality among elements of the virtual persistent heap that are cached in the physical heap, thus minimizing caching overhead.

One embodiment includes a caching mechanism in which the virtual persistent heap is divided into cache lines. A cache line is the smallest amount of virtual persistent heap space that can be loaded or flushed at one time. Caching in and caching out operations are used to load cache lines into the heap or to flush dirty cache lines into the store. To reduce heap waste, object locality in a cache line may be improved by using object caching nurseries and a generational garbage collector.

Database Store Method for a Virtual Persistent Heap

In one embodiment, a database store method and Application Programming Interface (API) may be provided for the virtual persistent heap. The database store method may provide a mechanism to cache portions of the virtual persistent heap into the in memory physical heap for the virtual machine. The virtual heap may be stored in a persistent store. Thus, in one embodiment, the database store method and API may be provided to manage the virtual persistent heap in the store. The store API may provide atomicity on the store transaction to substantially guarantee the consistency of the information stored in the database.

The database store API may provide several methods to manage the virtual persistent heap in the store. The methods may include, but are not limited to: opening the store, closing the store, atomic read transaction (read a set of cache lines), atomic write transaction (write a set of cache lines), and atomic delete transaction (delete a set of cache lines).

Garbage Collection Method for a Virtual Persistent Heap

A garbage collection method may be provided for the virtual persistent heap. In one embodiment, the garbage collection method may be used with small consumer and appliance devices, for example, Java-enabled devices, which may have a small amount of memory and may be using flash devices as persistent storage. In one embodiment, the garbage collection method is implemented to provide good performance where only a portion of the virtual persistent heap may be cached in the physical heap. The virtual persistent heap may use a single virtual heap address space for both the store heap and the in-memory heap. In one embodiment, a single garbage collector may be run on the virtual heap address space.

In one embodiment, the garbage collection method may start at the root of the heap and flag objects that are referenced (i.e. need to be kept in the heap). Then, objects not flagged may be removed from the heap. Alternatively, the garbage collection method may flag objects that are not referenced, and then may remove the flagged objects. Garbage collection may cause the heap to become fragmented so that a large object may not fit in available free space. The garbage collection method thus may include a compaction phase to reduce or substantially eliminate fragmentation and to improve object locality Small appliance and consumer devices may use flash devices for non-volatile memory storage. Flash devices typically have special characteristics, such as large write I/O blocks (for example, 128 Kbytes) and destructive writes. In one embodiment, the number of writes performed to the flash device by the garbage collector may be minimized to increase the life of the flash device. The garbage collector for the virtual persistent heap may be implemented using working sets and/or object nurseries for short life objects.

BRIEF DESCRIPTION OF THE DRAWINGS

Other objects and advantages of the invention will become apparent upon reading the following detailed description and upon reference to the accompanying drawings in which.

Figure 1A:
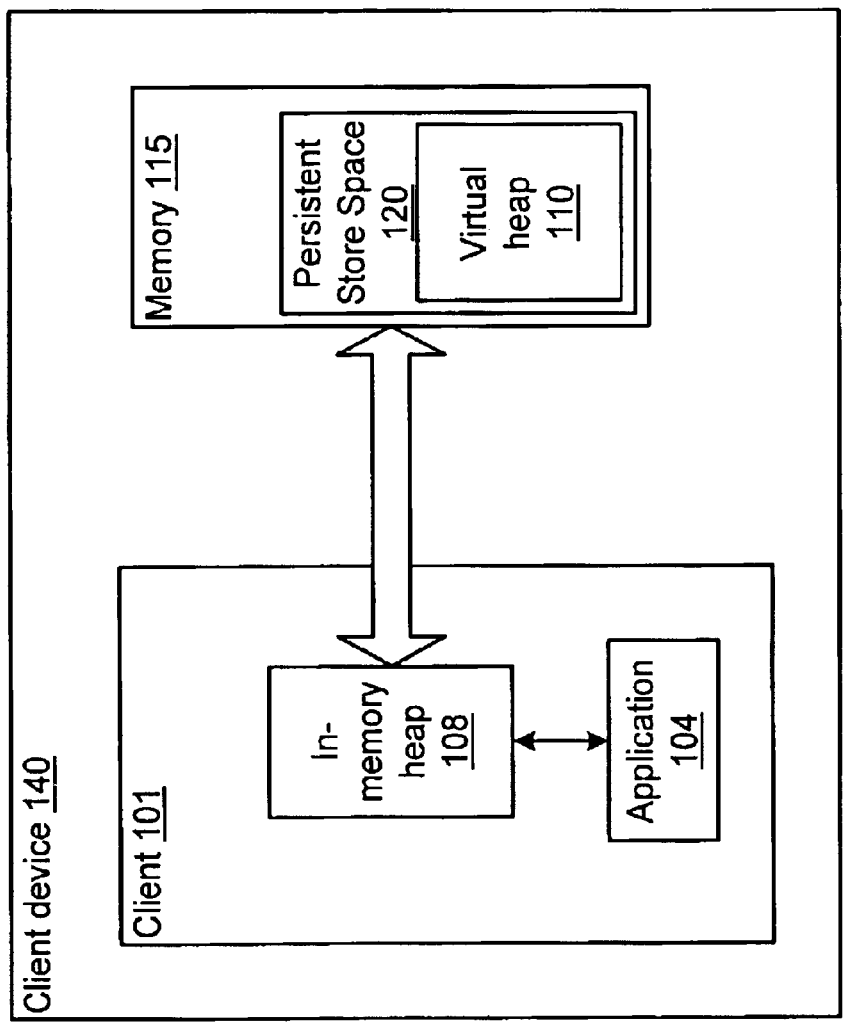
FIG. 1a is a block diagram illustrating a device with virtual persistent heap and persistent store space located on the device according to one embodiment of the invention.

Item numbers for objects in the Figures may be repeated in more than one Figure to signify objects that are substantially similar in the Figures.

While the invention is susceptible to various modifications and alternative forms, specific embodiments are shown by way of example in the drawings and are herein described in detail. It should be understood however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF SEVERAL EMBODIMENTS

FIG. 1a—A Device with Virtual Persistent Heap on the Device

FIG. 1a illustrates an embodiment of a device 140 with virtual machine 101 and a virtual heap with persistence, referred to as a virtual persistent heap. In a virtual persistent heap, the entire heap may be made persistent. The virtual persistent heap may enable the checkpointing of the state of the computation of the virtual machine to a persistent storage such as a disk or flash device for future resumption of the computation at the point of the checkpoint. The Virtual Persistent Heap also may enable the migration of the virtual machine computation states from one machine to another. Both the data and computation state may be migrated. One embodiment may also provide for the suspension and resumption of an application, such as upon restarting a device after an intentional or unintentional shutdown of the device.

In FIG. 1a, device 140 includes a client 101 and memory 115. Client device 140 may be a computer platform with operating system, such as a PC or laptop computer running an operating system such as Microsoft Windows 9x/NT, or a consumer or appliance device, for example, a cell phone or PDA. Client device 140 may include a service provider client, for example, a Jini client (not shown) for finding and leasing services on remote servers on a network. Client 101 may be a virtual machine such as a JVM or KVM. Client 101 may be used for running applications, for example, Java applications. One or more applications may be running on client 101, with one application typically executing and one or more applications suspended. Application 104 is shown as a currently executing application.

Memory 115 may be integrated in or directly attached to client device 140. Memory 115 may be a volatile memory such as Direct Inline Memory Modules (DIMMs) or non-volatile storage device such as a flash memory, a hard disk, or removable disk such as a floppy disk. This embodiment may use persistent store space 120 in memory 115 to store the virtual heap 110 for application 104. Persistent store space 120 may also include virtual heaps (not shown) for one or more other suspended applications.

Device 140 may comprises an operating system capable of executing the software to enable a virtual machine such as a JVM or KVM. The operating system may include a virtual memory manager (VMM) for managing virtual memory on device 140. The VMM may enable applications such as a virtual machine running on the device 140 to appear to have more physical memory than is actually present on the system by enabling virtual memory. The VMM may utilize storage such as a disk drive to set up a swap area. Sections of memory may be cached into a cache area in the physical memory for faster access by an application running on the device 140. Sections of memory may be flushed to the swap area on the storage when not actively in use by an application or to make room in physical memory for other sections of memory that may be in more immediate demand for direct access by an application. The sections of memory in the virtual memory on the device may be referred to as the heap for the application. Thus, a virtual machine running on device 140 may run on a heap in the virtual memory on the device.

The virtual machine may execute in a portion of the memory space managed by the operating system on the device 140. In one embodiment, the memory space may be a virtual memory space managed by a VMM for the operating system. The virtual machine may comprise a virtual machine memory space for use by processes executing on the virtual machine. As used herein, "process" may refer to, but is not necessarily limited to: applications, applets, programs, tasks, subprocesses, threads, and drivers. The virtual machine memory space may be managed by a virtual machine virtual memory manager (VM VMM) as described herein. The VM VMM may allow processes executing on the virtual machine to use a virtual heap as described herein, and may also provide persistence for the virtual heap. The virtual heap may include an in-memory heap as described herein, which may reside in the virtual machine memory space. The virtual heap may also include a store heap as described herein. In one embodiment, the store heap may be resident in the virtual machine memory space. In another embodiment, the store heap may be resident in memory external to the virtual machine, such as on a storage device attached to the device 140 directly or via the Internet, but accessible using the VM VMM. The entire memory space, including the virtual machine memory space and the store heap, may be referred to as the virtual machine virtual memory space.

The VM VMM as described herein may allow applications to execute on a virtual machine on device 140 that would otherwise require too much virtual machine memory space, and thus would not execute, by providing a virtual machine virtual memory space and a virtual heap for the application. The VM VMM and virtual heap as described herein may also allow multiple applications to run on a virtual machine by providing a store heap for each application, and allowing an application to be suspended by flushing its in-memory heap to its store heap, and a second application to be resumed by loading its in-memory heap into the virtual machine memory space from its store heap.

As used herein, the definition of a heap may include an area of computer main storage (memory) that a process may use to store data in some variable amount that won't be known until the program is running. A heap may be reserved for data that is created at runtime, that is, when a program is executing. A heap may also include portions of code for the process. In one embodiment, the process may be a Java process, and the code may be in Java classes. For example, a program may accept different amounts of input from one or more users for processing and then do the processing on all the input data at once. The heap may be pre-allocated for the process to use. The process manages its allocated heap by requesting a portion of the heap when needed, returning the portions when no longer needed, and doing occasional "garbage collecting," which makes portions of the heap available that are no longer being used and also may reorganize the available space in the heap to minimize fragmentation of the memory. In one embodiment, Java classes, including Java classes containing code for the process, may be garbage collected to remove classes (and thus process code) that are no longer in use. A heap may be portioned into blocks, sectors, pages, cache lines, or any other division of memory that meets the requirements of the heap management method.

A "stack" may be defined as an area of memory that may be used for data whose size can be determined when the program is compiled. A stack may be managed substantially similarly to a heap except that portions of the stack may be taken out of storage in a certain order and returned in the same way.

Client device 140 may also include volatile memory for loading and running client 101. Client 101 then may load and run applications in its memory space. In-memory heap 108 may be maintained in client 101 memory space, or alternatively may be maintained in memory external to client 101 memory space. In-memory heap 108 may include a portion of virtual heap 110 currently cached for use by application 104.

In-memory heap 108 and virtual heap 110 may be divided into one or more sections. The sections may be sectors, pages, cache lines, or any other division of memory space. In-memory heap 108 may be used by application 104 for storing data and code currently being used in the execution of application 104. In-memory heap 108 may include a portion or all of virtual heap 110. If application 104 requires code or data that is not currently in heap 108, one or more sections of virtual heap 110 may be copied into in-memory heap 108. If there is insufficient room in in-memory heap 108, one or more sections of in-memory heap 108 may be removed from heap 108 before copying in the new sections. If one or more sections being removed from heap 108 are "dirty" (have been written to), the one or more dirty sections may be written to (flushed to) virtual heap 110 before being removed from in-memory heap 108.

Application 104 may create new code and data in sections of in-memory heap 108. The new code and data in in-memory heap 108 may be flushed to virtual heap 110.

The in-memory heap 108 may include a portion of the virtual heap 110 that is cached (acts as physical memory) for use by application 104. In one embodiment, the virtual heap address space may be divided into fixed size pages. Page-in and page-out operations may be used to move pages from the virtual heap 110 in store 120 to the in-memory heap 108 or to eject pages from the heap 108. Pages, page states and page addressing are further illustrated in FIGS. 2, 3 and 4.

At certain times, a checkpoint for application 104 may be written to persistent store space 120. In this application, a checkpoint is a persistent store of the state of an application and its execution environment (such as the virtual machine state) at a point in time. After storing a checkpoint for application 104, persistent store space 120 may include an entire, up-to-date copy of the virtual heap 110. In one embodiment, persistent store space 120 may also contain an entire copy of the virtual heap for one or more other applications. In one embodiment, persistent store space 120 may include one or more versions of copies of the virtual heap (checkpointed states) for each application.

The virtual persistent heap may allow the running of an application on a physical heap 108 that is much smaller than may otherwise be required. As an example, the virtual persistent heap 110 may be an order of magnitude larger than the physical, in-memory heap 108. In one embodiment, the virtual persistent heap may be maintained on non-volatile memory storage external to the device running the application, and portions of the heap for the current execution state of the application may be cached in and out of a physical heap resident in local memory on the device. For example, the device may connect to a server on the Internet, and the server may provide non-volatile storage space for the virtual persistent heap. In another embodiment, the external storage for the virtual persistent heap may reside on a non-volatile storage attached to the device, for example, a Flash card or hard disk drive.

With persistence, an application may be checkpointed and suspended on a virtual machine, and a second application may then start execution on the virtual machine without ending the virtual machine process. This avoids the overhead of starting a new virtual machine for a new application. For example, a virtual machine may be launched on a system when one is required to run a first application. When a second application is launched, the web browser may not start a second virtual machine to run the second application, as is done in the prior art, but may instead checkpoint and suspend the first application, and then run the second application on the same virtual machine the first application was running on. The second application at some point may be checkpointed and suspended, and the first application may resume execution at the last checkpointed state prior to its suspension. In another example, a web browser may launch a virtual machine to run a first application. The web browser may keep the virtual machine active after the first application completes, and later use it to run a second application. In the prior art, terminating an application would have caused the virtual machine it was running on to terminate execution as well, requiring a new virtual machine to be launched for each application.

The virtual persistent heap may enable the saving of the entire state of the virtual machine heap for possible future resumption of the computation at the point the save was performed, and may permit the migration of the computation to a different system. In one embodiment, the saved state of the virtual machine heap may also provide the ability to restart the virtual machine after a system crash or shutdown to a previously saved persistent state. This persistent feature may be useful for small consumer and appliance devices including Java-enabled devices, such as cellular phones and Personal Digital Assistants (PDAs), as these appliances may be shutdown and restarted often. The virtual persistent heap may include the entire address space of the virtual machine heap an application is using.

Embodiments of the virtual persistent heap may include at least one of a caching method, a database store method, and a garbage collection method as described below.

Figure 1B:
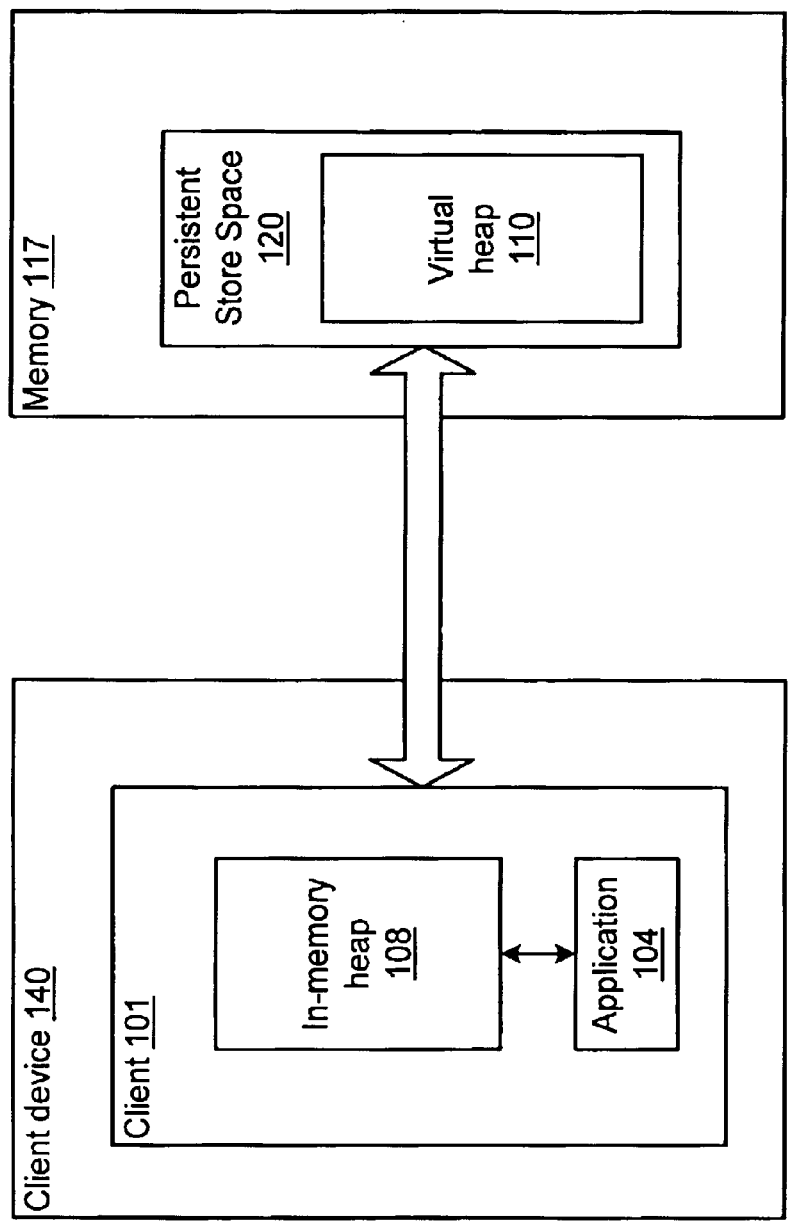
FIG. 1b is a block diagram illustrating a device with virtual persistent heap and persistent store space located external to the device according to one embodiment of the invention.

FIG. 1b—A Device with Virtual Persistent Heap External to the Device

FIG. 1b illustrates an embodiment of the invention where a device 140 includes a client 101, and memory 117 external to the client stores the persistent store space 120 with virtual heap 110. Memory 117 may be on any device external to but coupled to client device 140. Examples of methods in which the devices may be coupled include, but are not limited to: wireless connection (cell phones, Wireless Access Protocol (WAP)), infrared (IrDA), Ethernet, Universal Serial Bus (USB), and phone/modem. The connection may be an Internet connection. Memory 117 may be a volatile memory such as Direct Inline Memory Modules (DIMMs) or non-volatile storage device such as a flash memory, a hard disk, or removable disk such as a floppy disk. This embodiment may use persistent store space 120 in memory 117 to store the virtual heap 110 for application 104. Persistent store space 120 may also include virtual heaps (not shown) for one or more other suspended applications on device 140. Persistent store space 120 may also include virtual heaps (not shown) for one or more applications running on devices other than device 140.

The architecture and operation of in-memory heap 108 and virtual heap 110 as illustrated in FIG. 1b may be substantially similar to that described in FIG. 1a. In the embodiment illustrated in FIG. 1b, caching, checkpointing, and other reads or writes to virtual heap 110 may be performed over an external interface such as a network connection, rather than being performed over an internal interface such as a memory bus as in the embodiment illustrated in FIG. 1a.

Figure 1C:
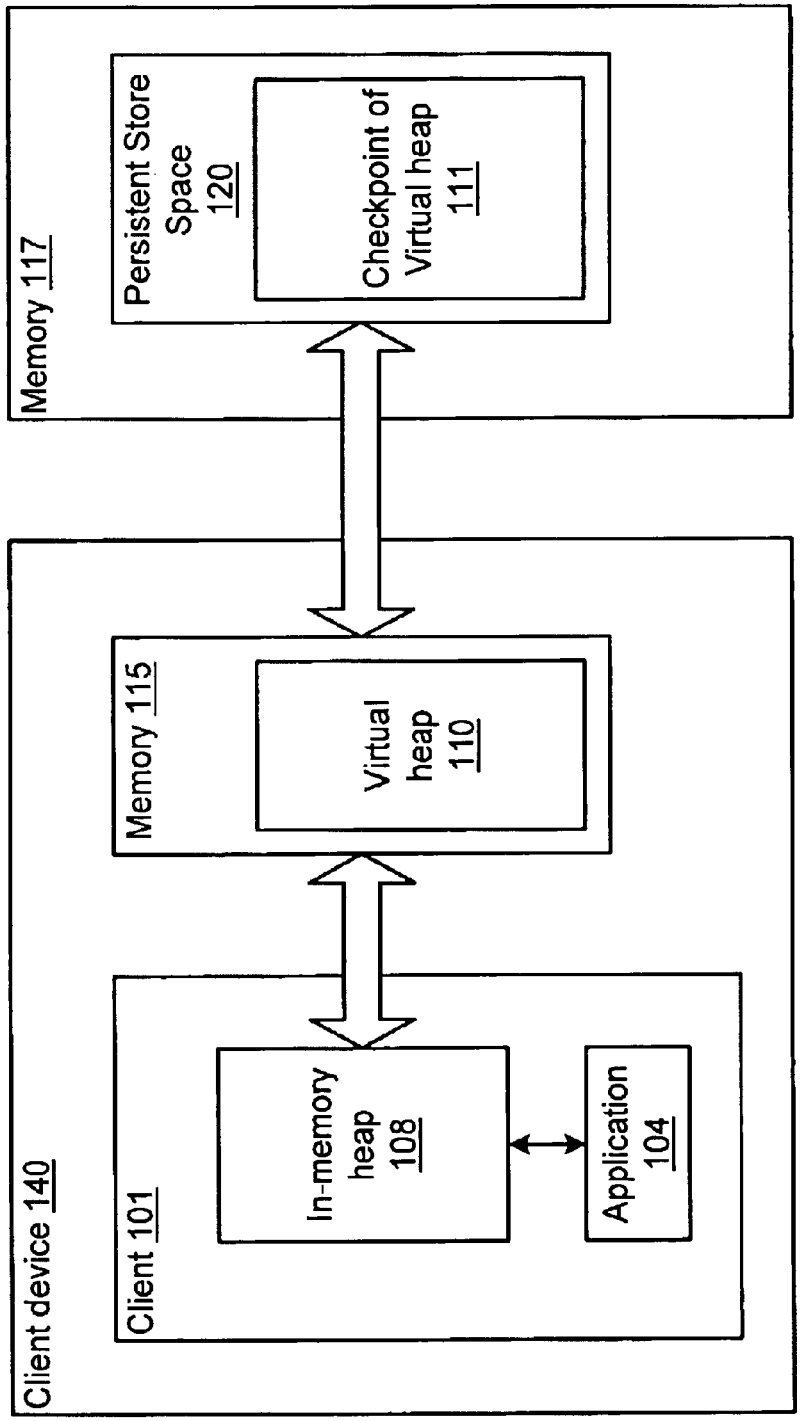
FIG. 1c is a block diagram illustrating a device with virtual persistent heap on the device and persistent store space located external to the device according to one embodiment of the invention.

FIG. 1c—A Device with Virtual Persistent Heap Internal to the Device and a Persistent Store External to the Device FIG. 1c illustrates an embodiment of the invention where a device 140 includes a client 101 and memory 115. Memory 115 may include virtual heap 110. This embodiment may also include a memory 117 external to the client. Memory 117 may include persistent store space 120 for holding checkpoints 111 of virtual heap 110. Memory 117 may be on any device external to but coupled to client device 140. Examples of methods in which the devices may be coupled include, but are not limited to: wireless connection (cell phones, Wireless Access Protocol (WAP)), infrared (IrDA), Ethernet, Universal Serial Bus (USB), and phone/modem. The connection may be an Internet connection. Alternatively, memory 117 may be integrated in or directly attached to device 140. Memory 117 may be a volatile memory such as one or more memory modules (for example, Direct Inline Memory Modules (DIMMs)), or a non-volatile storage device such as a flash memory, a hard disk, or removable disk such as a floppy disk. This embodiment may use persistent store space 120 in memory 117 to store the checkpoints 111 of virtual heap 110 for application 104. Persistent store space 120 may also include checkpoints of virtual heaps (not shown) for one or more other suspended applications on device 140. Persistent store space 120 may also include checkpoints of virtual heaps (not shown) for one or more applications running on devices other than device 140.

The architecture and operation of in-memory heap 108 and virtual heap 110 may be substantially similar to that described in FIG. 1a. Periodically, a checkpoint 111 of virtual heap 110 for application 104 may be written to persistent store space 120. After storing a checkpoint for application 104, persistent store space 120 may include an entire, up-to-date copy of the virtual heap 110. Persistent store space 120 may also include checkpointed copies of the virtual heap for one or more other applications.

Some embodiments may checkpoint one or more versions of virtual heap 110. For example, in the embodiment illustrated in FIG. 1c, multiple versions of checkpoint 111 for virtual heap 110 for application 104 may be stored in persistent store space 120. A method may be provided to select a checkpoint version from among one or more checkpointed version for resuming the application and/or virtual machine execution at a particular point.

Figure 1D:
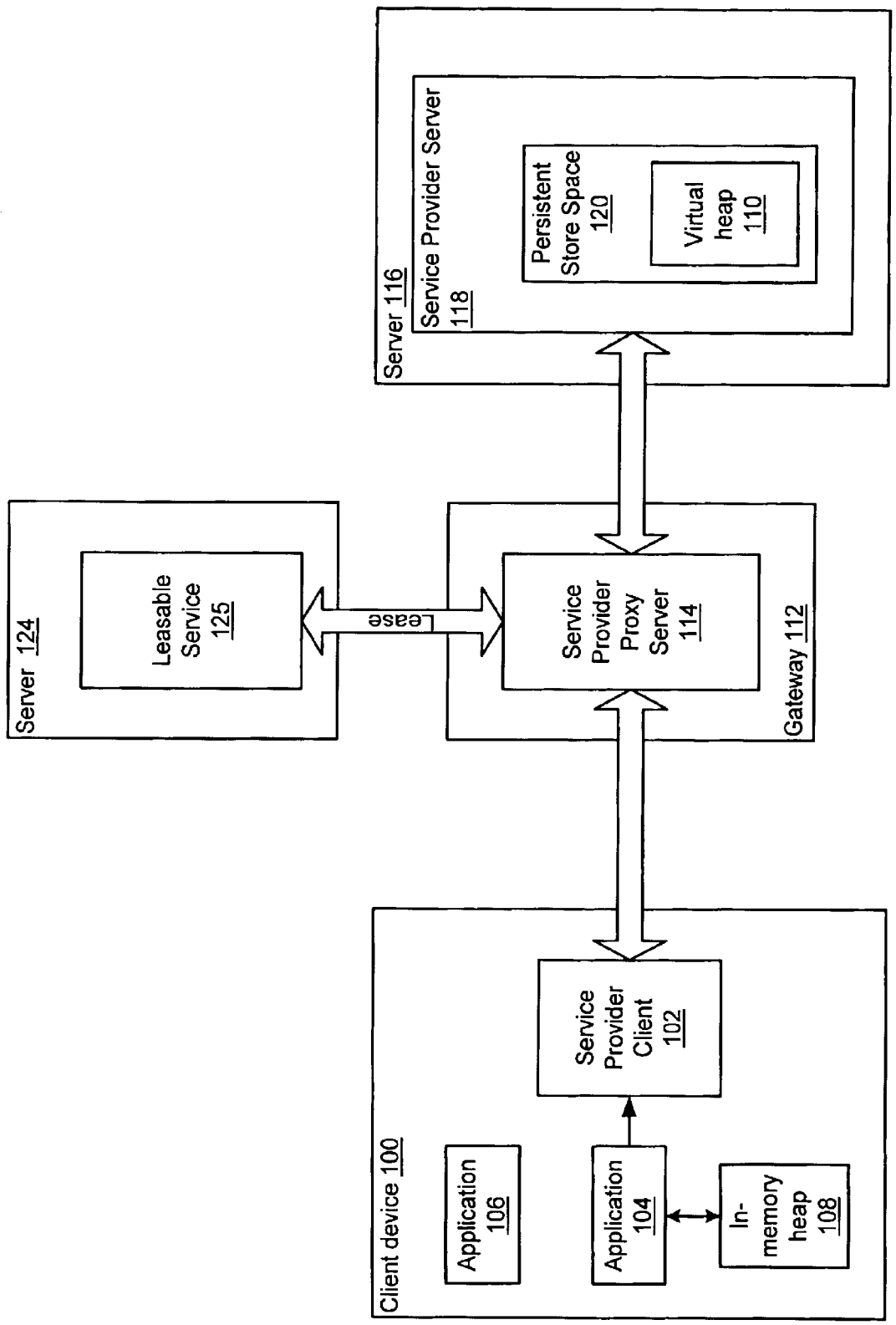
FIG. 1d is a block diagram illustrating a client device, proxy server, and server with persistent store space according to one embodiment of the invention.

FIG. 1d—A Client-server System with Persistent Store Space

FIG. 1d is a block diagram illustrating a network including client system 100, gateway server 112, and server system 116 according to one embodiment of the invention. Server system 116 may include a service provider server 118, for example, a Jini or other network service connection system or compact service connection system server.

Jini™

Sun Microsystems' Jini is an example of a Network Service Connection System (NSCS) that may be used with networked devices to locate and lease resources, herein referred to as services, on networked systems including servers, and to pass information to and from the services located on the networked systems.

The Jini technology makes it possible for an application to discover and use local and remote services. A local service may be a service that is provided on the same device as the application. A remote service may be a service that is provided by a device other than the device the application is executing on. Furthermore, applications that use such local and remote services may obtain leases on the services. These leases may expire after a certain amount of time (or on demand). By modifying an application to use Jini when it accesses local and remote services (and to handle expiration and reactivation of a lease), the problem of maintaining the external state of a process during process migration may be addressed.

The Jini system federates computers and computing devices on a network into what appears to the user as a single system. Each Jini technology-enabled device preferably has some memory and processing power. Devices without processing power or memory may be connected to a Jini system, but those devices may be controlled by another piece of hardware and/or software, called a proxy, that presents the device to the Jini system and which itself contains both processing power and memory.

The Jini system is Sun Java technology-centered. The Jini architecture assumes that the Java programming language is the implementation language for components. The ability to dynamically download and run code is central to a number of the features of the Jini architecture. However, any programming language can be supported by a Jini system if it has a compiler that produces compliant bytecodes for the Java programming language.

Services

A service is an entity that can be used by a person, a program, or another service. A service may be a computation, storage, a communication channel to another user, a software filter, a hardware device, or another user. Services may be local or remote. A local service may be provided on the same device as the user of the service. A user of a service may be called a client, and the device client is accessing the service from may be called the client device. Thus, a client may access a service on the client device. A remote service may be provided on a device other than (external to) the client device. Examples of services include devices such as printers, displays, or disks: software such as applications or utilities; information such as databases and files: and users of the system, and translating from one word processor format to some other. Jini systems provide mechanisms for service construction, lookup, communication, and use in a distributed system. Services in a Jini system communicate with each other by using a service protocol, which is a set of interfaces written in the Java programming language.

Services may be found and resolved using a lookup service. The lookup service may be the central bootstrapping mechanism for the system and may provide a major point of contact between the system and users of the system. In precise terms, a lookup service maps interfaces indicating the functionality provided by a service to sets of objects that implement the service. In addition, descriptive entries associated with a service allow more fine-grained selection of services based on properties understandable to people.

A service is added to a lookup service by a pair of protocols called discovery and join; the service first locates an appropriate lookup service (by using the discovery protocol), and then it joins the lookup service (by using the join protocol).

Service Leasing

Access to many of the services in the Jini system environment is lease based. A lease is a grant of guaranteed access to a service over a period. A service may be a resource external to the virtual machine within which an application desiring a service is executing. A service may be a local service or a remote service. In Jini, a lease may be negotiated between the user of the service and the provider of the service as part of a service protocol: a service is requested for some period, and access is granted for some period, presumably considering the request period. If a lease is not renewed before it is freed—because the service is no longer needed, the client or network fails, or the lease is not permitted to be renewed—then both the user and the provider of the service may conclude the service can be freed. Leases may be exclusive or non-exclusive. Exclusive leases insure that no one else may take a lease on the service during the period of the lease; non-exclusive leases allow multiple users to share a service.

In one embodiment, an application may establish one or more leases to local and/or remote services external to the application. In one embodiment, an application may establish one or more leases to system code that give the application access to resources external to the application such as system resources. System code for accessing an external resource may be referred to as a system service. A lease on system code for accessing an external resource may be referred to as a leased system service. For example, an application may establish leases to a system services that give the application access to system drivers for accessing communications ports in the system.

In one embodiment, interactions between services and applications may be stateless. For example, each interaction request may be handled by the receiver using information included with the request.

Jini and JavaSpaces™

The JavaSpaces technology package provides a distributed persistence and object exchange mechanism for code written in the Java™ programming language. Objects are written in entries that provide a typed grouping of relevant fields. Clients can perform simple operations on a JavaSpaces server to write new entries, lookup existing entries, and remove entries from the space. Objects in JavaSpaces are stored in Java Serialization Format. Server JavaSpaces provide persistent object storage replacing traditional file system storage persistence models. JavaSpaces servers provide network service connection system clients such as Jini clients access to a persistent and shareable object store.

Network Service Connection System for Small Footprint Devices

A consumer or appliance device with a small amount of memory may be referred to as a "small footprint device." A Compact Network Service Connection System (CNSCS) may be provided for use with small footprint network client devices (PDAs, cell phones, etc.) to locate and lease services on networked systems including servers, and to pass information to and from the located services and resources. The CNSCS may be designed specifically for use with small footprint network client devices that may be too "small" (not have enough resources such as memory) to support a system such as Jini.

The CNSCS may be embodied as a self-contained message-passing system that may operate among similar small systems, and may be bridged to a complete Jini federation using a bridging server. Examples of such a CNSCS is described in U.S. Provisional Patent Application No. 60/209,140 to Slaughter, Saulpaugh, Traversat, Abdelaziz, Duigou, Joy, and Pouyoul, titled "DISTRIBUTED COMPUTING ENVIRONMENT", filed Jun. 2, 2000, which is hereby fully incorporated by reference in its entirety, and in U.S. Provisional Patent Application No. 60/209,430 to Slaughter, Saulpaugh, Traversat, Abdelaziz, Duigou, Joy, and Pouyoul, titled "DISTRIBUTED COMPUTING ENVIRONMENT", filed Jun. 2, 2000, which is hereby fully incorporated by reference in its entirety, and in U.S. Provisional Patent Application No. 60/209,525 to Slaughter, Saulpaugh, Traversat, Abdelaziz, Duigou, Joy, and Pouyoul, titled "DISTRIBUTED COMPUTING ENVIRONMENT", filed Jun. 2, 2000, which is hereby fully incorporated by reference in its entirety.

CNSCS clients are typically small footprint devices that may include small display screens and keyboards. CNSCS clients may be mobile or non-mobile devices.

Examples of mobile CNSCS clients may include, but are not limited to: cell phones, palmtop computers, notebook computers, Personal Digital Assistants (PDAs), desktop computers, and printers. An example of a non-mobile CNSCS client may be a light switch comprising a simple chip capable of receiving a simple set of commands (on/off) and of transmitting a simple set of status messages (on/off status).

A CNSCS client may include core CNSCS software and one or more client applications. A CNSCS client may connect to a "fixed" network through a variety of paths. Examples of connection methods may include, but are not limited to: wireless connection (cell phones, Wireless Access Protocol (WAP)), infrared (IrDA), Ethernet, and phone/modem. CNSCS clients may connect to a network through gateways. The gateways provide the client devices with access to CNSCS servers on the network. A gateway may include a proxy CNSCS server. When connected, a CNSCS client "finds" a proximity network on which the client can run one or more applications from the network. One or more of the applications may only be available on the particular network. A CNSCS client may also connect to a network to remotely access files on a server.

A mobile CNSCS client may send out broadcast messages using whatever physical interface it has (IRDA, WAP, proprietary connection, etc). All that is required of the device is that it can send and/or receive messages. Some devices may only have to receive messages. For example, a CNSCS capable light switch may only need to receive and act on messages (ON message, OFF message, or TOGGLE message). More sophisticated CNSCS clients may send out a message to join a CNSCS federation.

Message Capable Networking in CNSCS

A distributed computing facility can be built upon a messaging layer. Furthermore, a messaging layer (providing both reliable and unreliable messages) can be built upon the socket networking classes provided in an embedded Java platform. TCP, UDP, and IP are examples of message capable protocols that may be leveraged by CNSCS. Other more specialized protocols such as the Wireless Application Protocol (WAP) are also capable of supporting CNSCS messages. WAP is tuned for networks with high latency and low bandwidth. CNSCS messages also work well with other network drivers such as IrDA (Infrared Data Association) and Bluetooth beneath the transport. The only required portion of CNSCS for a device (above the basic networking protocol stack) is a thin messaging layer, and all additional facilities are optional.

CNSCS Spaces

A CNSCS Space may be smaller and simpler than a JavaSpace. Some CNSCS Spaces are transient, while others are persistent. Transient spaces may be used as rendezvous mechanisms for peer-to-peer communication (Palm Pilot IRDA, for example). Server CNSCS Spaces may provide persistent object storage, replacing traditional file system storage persistence models.

CNSCS Space servers provide CNSCS clients access to a persistent (and potentially shared) object store. In one embodiment of a CNSCS, the objects stored in a CNSCS Space (and sent in a message) may be represented in XML (extensible Markup Language). XML may be used as the means of representing objects because it is sufficiently rich, as well as being an Internet standard.

A persistent CNSCS Space is a directory containing XML representations of objects. Because XML is used to represent the space and its objects, Internet search facilities can be leveraged to find spaces and objects within those spaces and Java and non-Java objects created in C++ or any other object-oriented language may be stored and retrieved from a CNSCS Space or placed in a message.

XML object representations are language independent. In one embodiment, only an object's data is represented in XML, not its code. This means that Java and non-Java applications can send and receive objects from each other. Classes (with encapsulated bytecode) may be stored in a CNSCS Space or passed in a message.

XML class representations may not be supported in all platforms due to security and size constraints. In one embodiment, threads may be compiled into XML to enable virtual machine migration to a CNSCS Space. In this model, the CNSCS Space may be used as a persistent heap/virtual machine store.

A Java virtual machine understands the structure of a Java object, so in one embodiment, CNSCS may provide JVM extensions for compiling a Java object to XML, and for decompiling XML into a Java object. In some embodiments, the CNSCS may provide other extensions for compiling and decompiling other object types into XML or other messaging languages.

Space Searching

A CNSCS client may not need a browser. Instead, a search may be offloaded to a server that performs the actual search using a front-end proxy that parses the results for the client. Hence, CNSCS Space queues may be Internet document searches triggered by messages sent to a proxy.

CNSCS Leasing

As in Jini, access to many of the services in the CNSCS system environment may be lease based. A lease is a grant of access to a service. In one embodiment, an application may establish one or more leases to local and/or remote services external to the application. In one embodiment, an application may establish one or more leases to system code that give the application access to resources external to the application such as system resources. The leasing mechanism may allow clients to obtain leases for objects in a CNSCS Space. In one embodiment, the CNSCS leasing mechanism may use tire-based leasing. In another embodiment, clients may make claims on Java objects, and register a callback method that may be invoked when another client desires a lease that is incompatible with current leaseholders. There may be several levels of CNSCS leases. A first level may not return a copy of the Java object when a lease is obtained, but simply registers an interest in this object being kept in the CNSCS Space. A second level does return a copy of the Java object when a lease is obtained at this level, but there could be multiple clients accessing the object. A third level does return a copy of the Java object when a lease is obtained at this level, and there are other clients are prohibited from accessing the object.

In one embodiment, interactions between processes and services provided through leases may be stateless. For example, each interaction request may be handled by the receiver using information included with the request.

Returning to FIG. 1d, service provider server 118 may include a persistent store space 120. Client system 100 may be a computer platform with operating system, such as a PC or laptop computer running Windows 9x/NT, or a virtual machine, for example, a JVM or KVM, sitting on top of a computer platform or executing on a consumer or appliance device, for example, a cell phone or PDA. Client system 100 may include a service provider client 102, for example, a Jini or CNSCS client, for finding and leasing services on remote servers. Client system 100 may be used for running applications and applets, for example, Java applications and applets. One or more applications may be executing on client system 100. Application 104 is shown as a currently executing application, and application 106 is shown as a suspended application. Application 104 may access an "in-memory" heap 108. Persistent store space 120 may include a virtual heap 110 for application 104. Persistent store space 120 may also include a virtual heap (not shown) for application 106.

Client system 100 may broadcast and receive messages using whatever physical I/O interface it has (IRDA, WAP, Ethernet, modem, proprietary connection, etc). Client system 100 may access services on one or more servers on the network including server 116. In one embodiment, the service provider client 102 may connect to servers on the network through gateway server 112. A gateway 112 may include a proxy service provider server 114. When connected, the service provider client 102 may find server 116 on which the client 102 may provide, via lease or otherwise, persistent store space 120 for virtual heap space for one or more applications including applications 104 and 106. Checkpoints for applications may be stored in persistent store space 120. Thus, persistent store space 120 may be a service that may be leased by an application using a service provider system such as Jini or CNSCS.

A lease may be established for a leasable service 125 on server 124. The lease may be established for application 104 by service provider client 102. Service provider 102 may establish the lease through service provider proxy server 114. In one embodiment, leases to services and/or resources on client device 100 may also be established.

The architecture and operation of in-memory heap 108 and virtual heap 110 as illustrated in FIG. 1d may be substantially similar to that described in FIG. 1a. In the embodiment illustrated in FIG. 1d, caching, checkpointing, and other reads or writes to virtual heap 110 may be performed over a network connection, for example, over the Internet, rather than being performed over an internal interface such as a memory bus as in the embodiment illustrated in FIG. 1a.

Figure 1E:
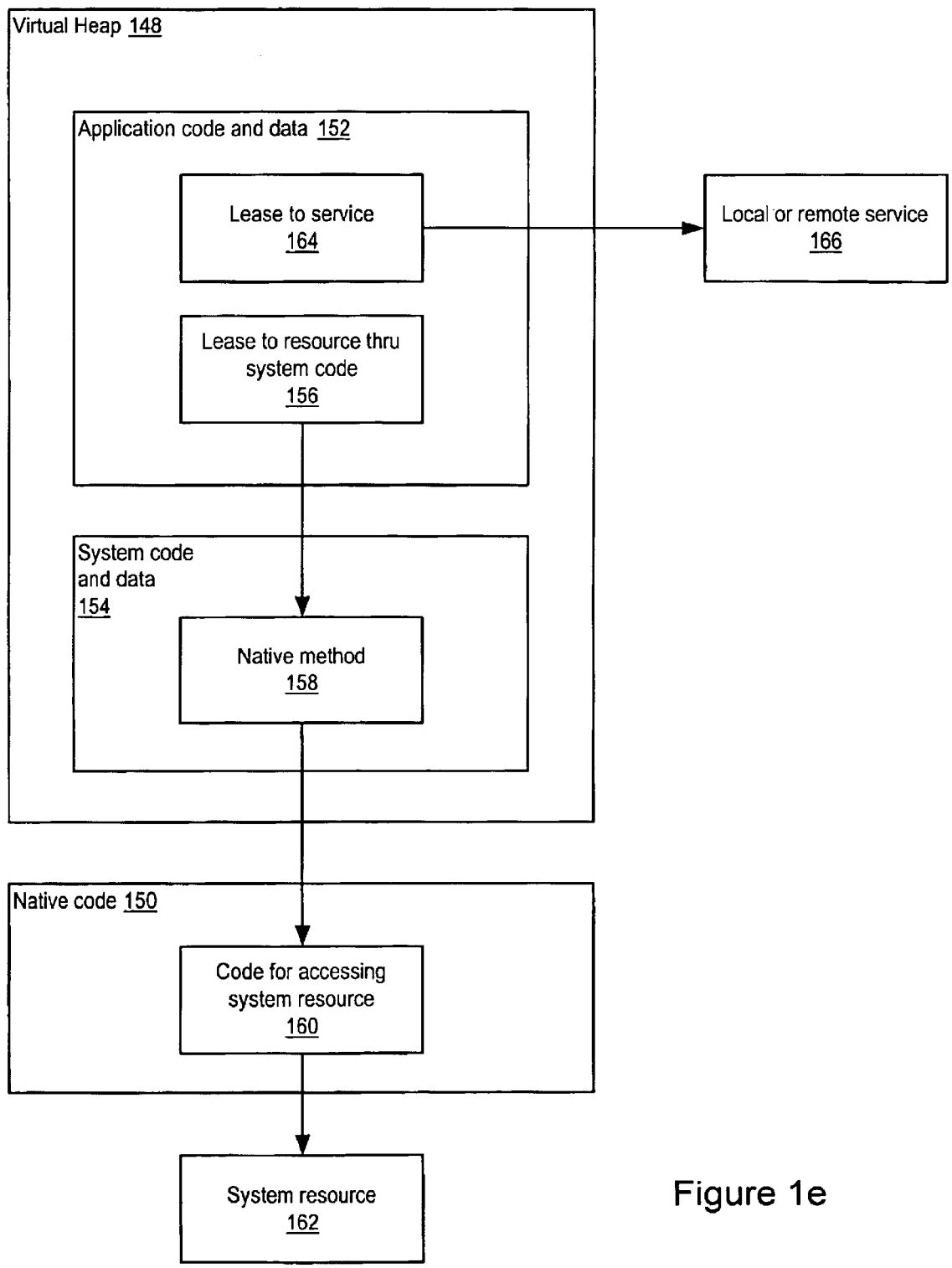
FIG. 1e is a block diagram illustrating a virtual heap and leases to local and remote resources according to one embodiment of the invention.

FIG. 1e—A Virtual Heap and Leases to Local and Remote Resources

FIG. 1e is a block diagram illustrating a virtual heap 148 for an application and leases to local and remote resources according to one embodiment of the invention. Virtual heap 148 may include one or more pages of application code and data 152. Virtual heap 148 may also include one or more pages of system code and data 154. Pages 152 may include a lease to a service 164 that may include information describing the lease relationship with a service 166. Service 166 may be a local or remote service. In one embodiment, the lease may be established using an NSCS such as Jini. In another embodiment, the lease may be established using a CNSCS.

Pages 152 may also include a lease to system code 156. In one embodiment, the lease may be established using an NSCS such as Jini. In another embodiment, the lease may be established using a CNSCS. The lease to system code 156 may give the application access to a system resource 162 by leasing native method 158. Native method 158 may be system code that invokes one or more system native code functions 160 for accessing system resource 162. For example, system resource 162 may be a bus port such as a USB port. Code 160 may be the native language driver for the USB port. Native method 158 may include the code necessary to invoke various functions provided by the native language USB driver.

In one embodiment, when the application is checkpointed, the system code and data pages 154 may not be checkpointed. When the application code and data pages 154 are checkpointed, service lease 164 and system resource lease 156 may be checkpointed. In one embodiment, the information checkpointed for a lease (system resource or service lease) may include enough information to re-establish the lease if necessary. In one embodiment, leases to system resources and services may be stateless—no record of previous interactions between the application and the service or resource may be kept, and each interaction request between the application and the service or resource may be handled based entirely on information that comes with it. Being stateless may simplify the checkpointing of the leases because no current or past state information needs to be checkpointed for the leases. If the application needs to be migrated to another device, or if the application is suspended for some reason, then the leases held by the application may be cancelled, releasing the services and/or resources held by the leases. When the application is resumed (locally or on another device), then the lease information from the checkpointed state of the application may be used to reestablish the leases to services and/or system resources.

In one embodiment, an application may migrate to a device with a different system and native language than the system and native language of the device from which it is migrating. In this embodiment, the lease to system resource 156 may be re-established to a method 158 in the system code 154 of the device to which the application migrated. Native code functions 160 for accessing system resource 162 may be in the native code of the new device.

In one embodiment, the application may migrate to a device that does not have system resource 162. In this case, the application may be notified that the lease to the system resource cannot be reestablished. In one embodiment, the application may migrate to a device that does not have access to service 166. In one embodiment, the application may be notified that the lease to the service cannot be re-established. In one embodiment, when it is discovered that service 166 is not available, an alternate service may be searched for to fulfill the functionality of service 166, and, if found, a lease may be established to the alternate service.

Figure 1F:
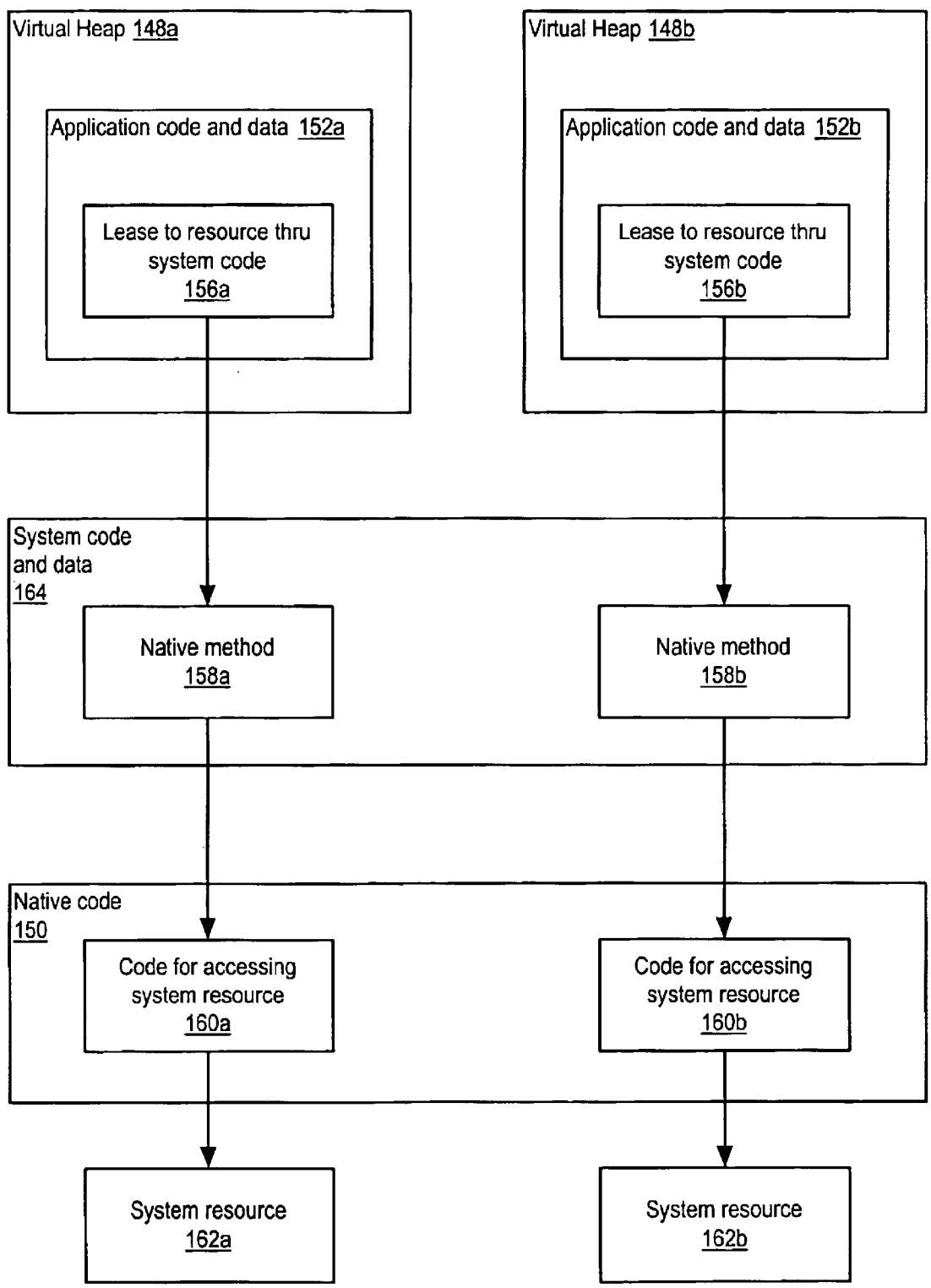
FIG. 1f is a block diagram illustrating application virtual heaps and leases to system resources according to one embodiment of the invention.

FIG. 1f—A Virtual Heap and Leases to System Resources

FIG, 1f is a block diagram illustrating a virtual heap 148a and 148b for two applications with leases to system resources 162a and 162b according to one embodiment of the invention. In this embodiment, a heap 164 external to virtual heaps 148a and 148b may be used to store system code and data that may be shared among two or more applications.

Virtual heaps 148a and 148b may each include one or more pages of application code and data 152a and 152b. Pages 152a and 152b may include leases to system code 156a and 156b that may give the application access to system resources 162a and 162b respectively by leasing shared native methods 158a and 158b. Native methods 158a and 158b may include system code that may invoke one or more native code functions 160 for accessing system resources 162a and 162b.

Some system resources may be shareable and others may require exclusive access privileges. In one embodiment, if a native method in heap 154 allows shared access, two or more applications may hold leases to the same native method, and thus the same system resource, simultaneously.

Figure 2:
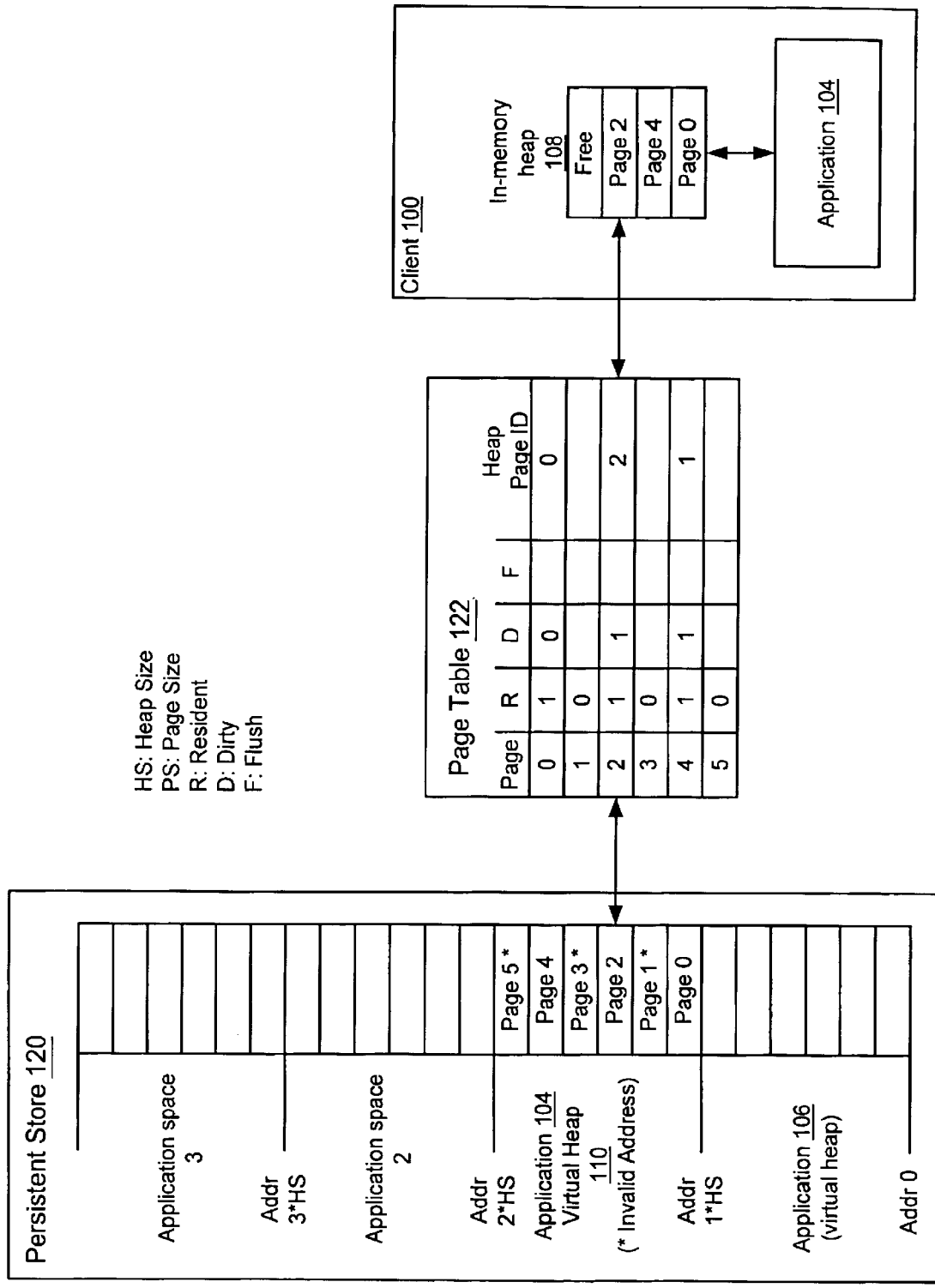
FIG. 2 is a block diagram illustrating virtual persistent heap architecture according to one embodiment of the invention.

FIG. 2—Virtual Persistent Heap Architecture

FIG. 2 is a block diagram illustrating a virtual persistent heap architecture according to one embodiment of the invention. Application 104 may be executing in client system 100. Application 104 may be using in-memory heap 108.

Persistent store 120 may reside on a server on the network to which client system 100 has access, or alternatively may be located in a local non-volatile memory on the system application 104 is executing on. Page table 122 may reside on the same system as application 104 or alternatively may reside on another system on the network.

The persistent store 120 may include an entire copy of the virtual heap 110 (virtual memory) for application 104. The "in-memory" heap 108 may include a portion of the virtual heap 110 that is cached (acts as physical memory). In one embodiment, the virtual persistent heap is a page-based heap. The virtual heap address space is divided into fixed size pages. Page-in and page-out operations are used to move pages from the persistent store 120 to the in-memory heap 108 and to eject pages from the in-memory heap 108.

In this application, the terms "physical heap" or "heap" may be used to indicate the heap structure in memory 108. This is only a portion of the total virtual heap 110 saved in the persistent store 120. The term "virtual heap" may be used to indicate the entire heap image saved in the store 120. The "in memory" heap address space may be viewed as the physical memory. The "in store" heap address space may be viewed as the virtual memory.

The store 120 may be segmented into two or more disjoint virtual heaps. Each checkpointed application such as application 104 has its own virtual heap space reserved in the store. In exemplary persistent store 120, a virtual heap space exists for application 106 and application 104, and two unused virtual heap spaces exist to allow for two more applications.

Paging provides a simple model to move data from the persistent store 120 to the in-memory heap 108 in virtual machine 100. In one embodiment, a page table 122 and offset based address translation may be used to convert virtual heap 110 references into in-memory heap 108 references. Relatively small pages may be used to reduce heap waste. In one embodiment, a paging-based approach may enable page protection mechanisms and support for DMA and block I/O devices.

In one embodiment, object-caching granularity may be implemented instead of paging. Object-caching granularity is possible if objects can efficiently be moved in the heap. A consideration in embodiments using object handles is the memory footprint constraint. The object handle area may take more memory space than related structures such as handle tables in embodiments using pages.

Using page handles rather than object handles may give the ability to tune the implementation to fit the memory footprint requirement of a targeted device. The page size determines the amount of space required for the handle table. Larger memory environments may use smaller pages. Smaller memory environments may need to use larger pages. Larger objects may be broken up and stored across multiple pages, allowing portions of objects to be cached in an out of the in-memory heap 108. This may allow devices with limited memory resources to support objects, and therefore applications, that may not be supportable with object caching granularity. With object caching granularity, the entire object may have to be cached into in-memory heap 108.

One embodiment may use a page-in and page-out approach to bring pages from the virtual heap 110 into the in-memory heap 108. For embodiments in which persistent store 120 is comprised in a flash memory device, paging-out may use a scatter/gather object phase to only write updated objects to increase the life of the flash device. In one embodiment, this may be combined with a log-based approach to guarantee atomicity on store transactions.

In a paging-based system, the page size may be increased to reduce the page table 122 size. Increasing the page size may permit the grouping of multiple objects into a single page. In this case, a single page table entry may play the role of multiple object handle entries (one handle for each object in the page). Grouping objects into a single table entry may allow the reduction of the memory footprint required for a handle table, as there may be fewer handles. Updating a single object in the page may require the writing of the entire page (all objects in the page). Alternatively, reducing the page size allows fewer objects to be stored in a page, thus reducing paging granularity. This approach may increase the page table size. The page size may be adjusted accordingly based upon memory constraints on the device on which the paging-based system is implemented.

In one embodiment, the virtual heap 110 may be divided into a fixed number of pages. In one embodiment, to aid in efficient address translation, the application virtual heap size (i.e. the Kernel plus all user pages) may be a fixed multiple of the size of the in-memory heap 108. This allows each application virtual heap store to start at a multiple heap size offset in the persistent store 120. In this embodiment, the address translation includes subtracting a fixed heap size multiple. Since a virtual machine may not have access to a hardware translation mechanism, the address translation may be simplified so it can be efficiently performed in software.

Figure 4:
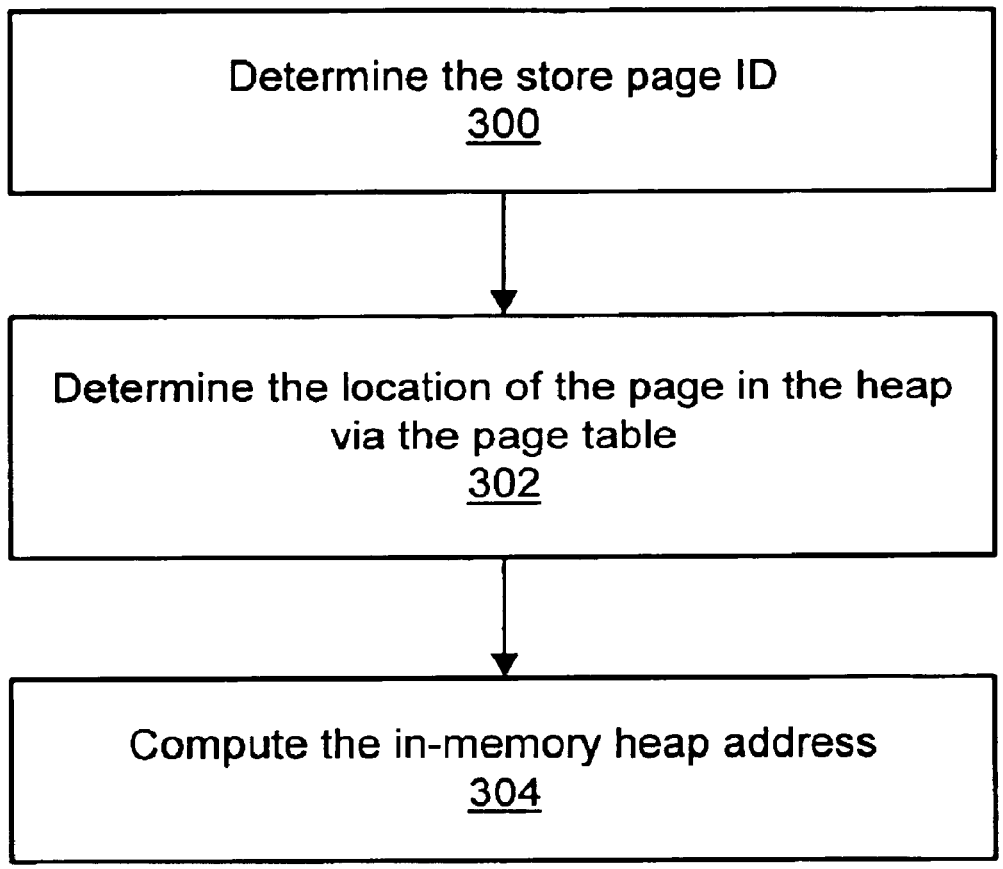
FIG. 4 is a flowchart illustrating a computation method for the in-memory heap page addresses according to one embodiment of the invention.

An offset based schema may be used to convert a virtual heap address into an in-memory heap address. All object references in the virtual heap 110 and the in-memory heap 108 may be kept as virtual heap addresses. In one embodiment, there may be an address translation to convert the virtual heap address into the physical heap location. The CPU of the system or CPU layer of the virtual machine may perform address translation from the virtual heap address space into the in-memory heap location via a Page Table 122 entry. The Page table 122 maintains the mapping of the virtual heap 110 page into the heap 108. For each virtual heap 1 10 address reference (read or write), code may be inserted (read/write barriers) to verify the validity of the address (i.e. check if the corresponding page is resident in the heap), and to translate it into the in-memory heap 108 reference. The process of converting heap addresses is illustrated in FIG. 4.

In some embodiments, the virtual machine CPU layer, for example, the Java CPU layer, may provide access to hardware Memory Management Unit (MMU) address translation functions, allowing object handle indirections to be done in hardware.

In one embodiment, an object in the virtual address space may maintain references to other objects via a valid or invalid address. A valid address may mean the corresponding page is resident in the in-memory heap 108. An invalid address may mean the corresponding page is not resident in the in-memory heap 108.

Page Table 122

In one embodiment, page table 122 is not persistent, but is a "live" structure. The page table may be reinitialized whenever a new application is restarted. In one embodiment, the page table 122 may include one or more of the following entries for a page of the active application virtual heap 110:

Type (User or System): The page type is used to select the write through policy used to backup the page into the persistent store 120 as well as the paging policy (which page to eject). As an example, System pages may be pinned in the in-memory heap 108 and may not be paged out.

Resident (TRUE or FALSE): In one embodiment, the resident bit may be used to maintain the heap residency state of the page, and may be TRUE if the page is resident in heap 108 or FALSE if the page is not resident in heap 108. In another embodiment, a value stored in a heap page ID field may be used to indicate if a page is resident in the heap. For instance, if a memory address is used to indicate the heap page ID, a NULL address or other invalid address may be used to indicate if the page is resident. In yet another embodiment, only pages that are currently cached in in-memory heap 108 may have an entry (row) in page table 122.

Dirty (TRUE or FALSE): Keeps track of any write or modification of the page in heap 108. TRUE if the page is dirty (has been modified or written to).

Flushing (TRUE or FALSE): Only valid for dirty pages. Indicates the page is in the checkpoint queue. If TRUE, the page is in the list of pages that are to be flushed to the virtual heap 110 in store 120.

Heap Page ID: Specifies the location of the page in the heap 108.

In one embodiment, as shown in FIG. 2, there may be one entry in the page table 122 for each page of the active application virtual heap 110. This embodiment may simplify the location of an entry for a page in the page table 122. In another embodiment, there may be one entry in the page table for each page currently cached in in-memory heap 108. This embodiment may reduce the size of the page table 122.

Read-only/static core virtual machine objects may be located into pinned and read-only system pages (objects may be tagged by the primary class loader). These classes are typically not loaded twice. Read/write core virtual machine objects may be located into user pages. In one embodiment, read/write core virtual machine objects may be "colored" as system pages. All user objects may be allocated in user pages.

In one embodiment, an application may establish one or more leases to system objects that may give the application access to resources external to the application such as system resources. In one embodiment, system pages in a heap may include system objects (code and/or data) that are currently leased. In one embodiment, the leases for the system objects may be contained in the application virtual heap 110.

In embodiments that allow the running of only one application at a time, each application virtual heap may contain its own set of system pages. In these embodiments, system pages are not shared among applications. In embodiments running more than one application at a time, system pages may be shared among applications. These embodiments may have a system segment in the persistent store 120 to checkpoint static and read-only pages that can safely be shared among applications.

Figure 3:
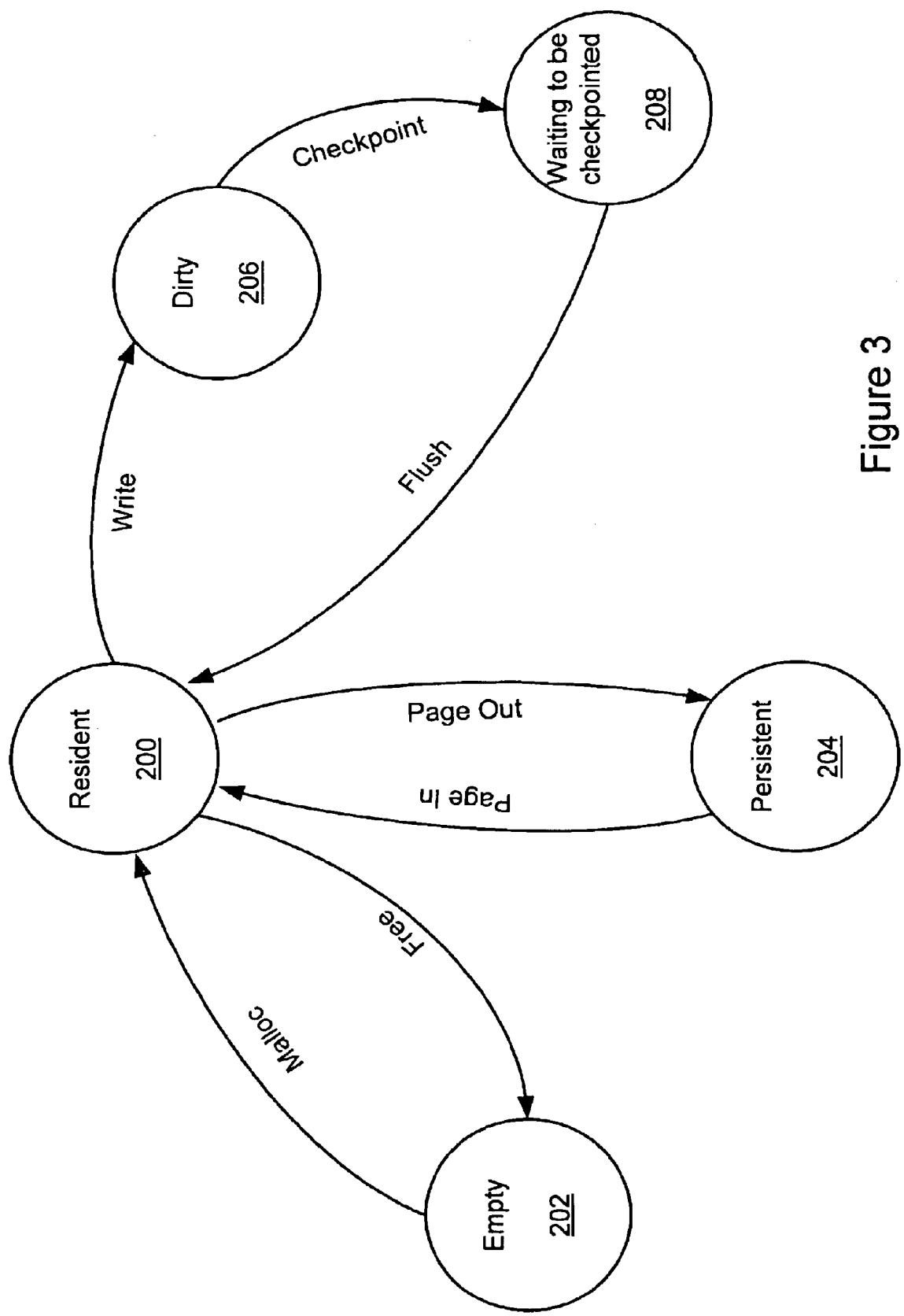
FIG. 3 is a state diagram illustrating the states of a page in a virtual persistent heap according to one embodiment of the invention.

FIG. 3—The States of a Page in a Virtual Persistent Heap

FIG. 3 is a state diagram illustrating the states of a page in a virtual persistent heap according to one embodiment of the invention. A page may be in one of the following states:

Empty: The page has been freed or has not been allocated.

Resident: The page has been newly allocated or the page has been paged in from the virtual heap 110 in persistent store 120 to the in-memory heap 108. No changes have been made to the page, or the latest changes have been flushed to the persistent store 120. The copy in the heap 108 is synchronized with the copy in the store 120.

Dirty: A write to the page has been performed and the page has not been written back to the persistent store 120. No request for checkpointing the page has been made.

Waiting to be checkpointed: The page is in a list of pages to be checkpointed to the store 120. The page is currently write locked, so no further write can occur until the page has been flushed.

Persistent: The page has been paged out. The page is no longer resident in the heap 108.

Page Fault

A page fault occurs when a reference is made to a page not resident in the in-memory heap 108. The page fault may induce a caching of the page from the virtual heap 110 in store 120 to the heap 108. When a page fault occurs, the following conditions may be encountered:

There is a free page available in the heap 108: The page may be brought into the heap 108 and the page table 122 entry updated.

There are no free pages in the heap 108: Before the page can be cached, room needs to be made in the heap. One or more resident pages need to be evicted from heap 108.

In one embodiment, when looking for candidate pages to be evicted, more than one page may be selected for eviction, since it is likely that another page may need to be evicted soon. In one embodiment, a free page threshold may be used to induce this behavior. In one embodiment, a standard LRU (Least Recently Used) method may be used to select pages for eviction (page out). In other embodiments, other methods, for example, Least Frequently Used (LFU), may be used to select pages for eviction.

If a page is dirty, the page may be checkpointed to the store 120, or alternatively a shadow copy is made, before being freed from the heap 108. In one embodiment, non-dirty pages may be evicted before dirty pages.

Page Checkpointing

As previously described, pages may be brought into the heap 108, modified and checkpointed to the virtual heap 110 in store 120 when they are evicted. In one embodiment, pages may be checkpointed when there are evicted. Alternatively, pages may be checkpointed when they remain in the heap 108. For instance, if checkpointing can be performed asynchronously (an executing thread does not have to be frozen), then pages may be checkpointed whenever convenient with minimum overhead to look for dirty pages.

In embodiments with a single threaded virtual machine environment using a simple bytecode count as a time sharing quantum for switching between threads, pages to be checkpointed may be searched for whenever a thread synchronization or a context switch occurs. On a thread context switch, dirty pages may be scanned for and placed in a checkpoint queue. In another embodiment, a mechanism to interrupt the running thread may be used to provide an opportunity to search for and checkpoint pages.

The flush bit in the Page Table 122 may be used to mark pages that are in the checkpoint queue. Further writes may be prevented to the page while the page is in the queue or in the process of being checkpointed. In one embodiment, the thread may be blocked until the page is written. In this embodiment, the checkpoint queue may be reordered to prioritize pages that have a blocked thread. In another embodiment, a copy of the page may be made to let the thread "go" on the shadow copy. A recently checkpointed page may not be put back into the checkpoint queue right away.

System pages may have a different checkpoint strategy than user pages. For instance, checkpointing system pages may freeze the entire virtual machine. System pages may therefore be more selectively checkpointed than user pages.

Store Checkpoints and Consistency

Having pages checkpointed individually may be insufficient to maintain the consistency of the virtual heap 110 in store 120. For instance, if two pages have changed in the heap 108, but only one page has been checkpointed, and the system crashes, the checkpointed virtual heap 110 in store 120 may end up in an inconsistent state. When the system restarts with an inconsistent store 120, the application may crash due to incorrect pointer locations. There is no guarantee that pages put in the checkpoint queue will be checkpointed to the store 120 (the system may crash at any time). In one embodiment, in order to capture a consistent virtual machine state, the set of changes made to the store 120 may be combined into an atomic operation. An atomic operation is an operation may comprise a series of steps that are not finalized until all of the steps in the atomic operation are confirmed to have successfully completed. The atomic operation allows all of the steps in the operation to be undone if any of the steps in the operation do not complete successfully. The process of undoing all of the steps in an atomic operation may be referred to as "rolling back" the operation. In the example above, if one of a series of two or more checkpoints in a checkpoint queue are not completed when recovering a crashed system, the system may be "rolled back" to a previous checkpointed state.

In one embodiment, a transaction-based API to allow the client system 100 to issue checkpoint requests may be provided. Using the API, the client system 100 may tell the store:

when a new transaction starts what heap pages need to be saved when the transaction is committed A store checkpoint may have one or more of following states which may be made permanent to the store:

Saved all dirty user pages since the last checkpoint.

Saved all dirty system pages since the last checkpoint.

Save the current state of non-heap (for example, virtual machine) internal structures (thread contexts, pointer to main structure in the heap such as classes, constant pool, etc.).

In one embodiment, the client system 100 may have only one outstanding store transaction at a time. Each successive store checkpoint may be encapsulated in a different transaction. When a store checkpoint is issued, client system 100 execution may need to be stopped for as short a time as possible in order to save non-heap virtual machine structures.

One embodiment may provide for pre-flushing of dirty pages by allowing dirty pages to be checkpointed independently of the store checkpoint. Thus, when a store checkpoint is issued, all heap 108 pages may have already been saved (pre-flushed) into store 120. Thus, the only structures that may need to be stored are a few dirty system pages and the virtual machine non-heap structures. In one embodiment, the store may verify that all states have been correctly written to the store 120 when the checkpoint transaction is committed. If one or more writes failed or did not complete, the store may abort the transaction and roll back to the last committed checkpoint. In one embodiment, if the checkpoint fails, but client system 100 is still running, the client system 100 may continue to run under restrictions, such as no more paging allowed, and also warning the user that the store has been lost. In another embodiment, the client system 100 may be stopped when the checkpoint fails. In one embodiment, an application level checkpointing API may be provided to inform the application 104 that the checkpointing failed.

The client system 100 may verify that any heap or non-heap changes are correctly recorded as part of the store transaction. The store may verify that all changes have been made persistent (written to non-volatile storage such as disk or flash memory) and the store is left in a consistent state.

The client system 100 may rely on the store to guarantee transaction ACID properties. ACID is the acronym used to describe the following properties of a transaction:

ATOMICITY: a transaction should be done or undone completely. In the event of a failure, all operations and procedures should be undone, and all data should roll back to its previous state.

CONSISTENCY: a transaction should transform a system from one consistent state to another consistent state.

ISOLATION: each transaction should happen independently of other transactions occurring at the same time.

DURABILTY: Completed transactions should remain permanent, even during system failure.

In one embodiment, the store may only maintain one checkpoint per application (the last successfully committed checkpoint). In another embodiment, the store may maintain one or more checkpoints per application, and the client system 100 may select which checkpoint to use when restarting an application.

Since each application store is kept in a different persistent store 120 virtual heap segment, the current application heap segment may be "touched" for a checkpoint, while other application segments are untouched.

In one embodiment, a store management User Interface (UI) may be provided, and may allow the removal of an application's corrupted virtual heap.

When to Commit a Store Checkpoint?

In one embodiment, in order to keep the heap 108 and client system 100 states very closely synchronized with the store 120, a store checkpoint may be issued any time a change is made. This embodiment may not be practical due to the high incidence of store checkpointing that may degrade performance. To avoid performance degradation, the heap 108 and client system 100 state may be loosely synchronized with the store 120 state, and store checkpoints may only be issued under certain conditions. The following are examples of conditions that may be used in deciding when to issue a store checkpoint:

Since the client system 100 may be interrupted to commit a store checkpoint, a time may be selected to perform the checkpoint that may generate the least amount of overhead. Fir example, when a client system performs a thread switching or synchronization, a check may be made to see if a checkpoint needs to be performed. Checkpointing may be performed asynchronously, so the overhead may be defined in terms of issuing the request, not executing the request.

The number of pages written since the last committed checkpoint may be. considered. If many pages were updated, the changes may be committed as soon as possible.

The speed at which a transaction checkpoint can be performed to the store may be considered. If store operations are slow, the number of checkpoints may have to be limited. Buffering may not be an option in a tight memory environment.

A checkpoint may be performed after a garbage collection, since many pages may have changed due to object collections and heap compacting.

How long since the last checkpoint occurred may be considered. For instance, an application may be compute-intensive and touch a very small number of pages. To save the computation state, a checkpoint may be induced after a maximum elapsed time, if none of the previous conditions occurred.

Whenever the application is suspended, and client system 100 is in the process of switching to a new application, a checkpoint may be committed for the suspended application.

FIG. 4—A Computation Method for the In-memory Heap Page Addresses

FIG. 4 is a flowchart describing a computation method for in-memory heap page addresses according to one embodiment of the invention. In one embodiment, the translation of a virtual heap page reference to an in-memory heap page reference may include the following steps. In step 300, the store page ID may be determined. An example of a method for determining the store page ID is:

$$PageID = Sadd - (App*ID\ HS) << PageS$$

Sadd: The virtual heap page reference address to be translated.

AppID: The current application ID used to select the store virtual heap. For example, in FIG. 2, application 104 may have an application ID of 1.

HS: The virtual heap size (may be a multiple of the in-memory heap size)

<<: shift operator (may be left or right shift depending on bit order representation in the system)

PageS: Page size bit shift

In step 300, first, the application ID may be multiplied by the virtual heap size to get the base address of the virtual heap for the application. Second, the base address of the virtual heap may be subtracted from the virtual heap page reference address to produce an address offset from the base address. Third, the address offset may be shifted to remove the bits containing the in-page address information. For example, if a page comprises 256 addressable bytes, the address may be shifted 8 bits. In one embodiment, the result of the shift is the page ID for the virtual heap page reference. In step 302, the location of the page in the heap may be determined from the page table:

$$HeapPageID = PageTable\ (PageID)$$

For example, referring again to FIG. 2, if the result of step 300 is virtual heap page 4, looking up the virtual heap page 4 row in page table 122 produces a heap page ID of 1.

If the page is not resident, a page fault may be issued to bring the page into the heap. In step 304, the in-memory heap address may be computed. An example of a method for computing the in-memory heap address is:

$$Hadd = HeapPageID * PageS + Sadd\ \&\ PageMask$$

PageS: Page size
Sadd: The original virtual heap page reference address
PageMask: Page Size bit mask
&: Bitwise AND operator First, the heap page ID produced in step 302 may be multiplied by the page size to produce the base address of the in-memory heap page. The original virtual heap page reference address may then be ANDed with a page size bit mask to produce the bits containing the in-page address information. The in-page address information may then be added to the base address of the in-memory heap page to produce the in-memory heap address.

Figure 5A:
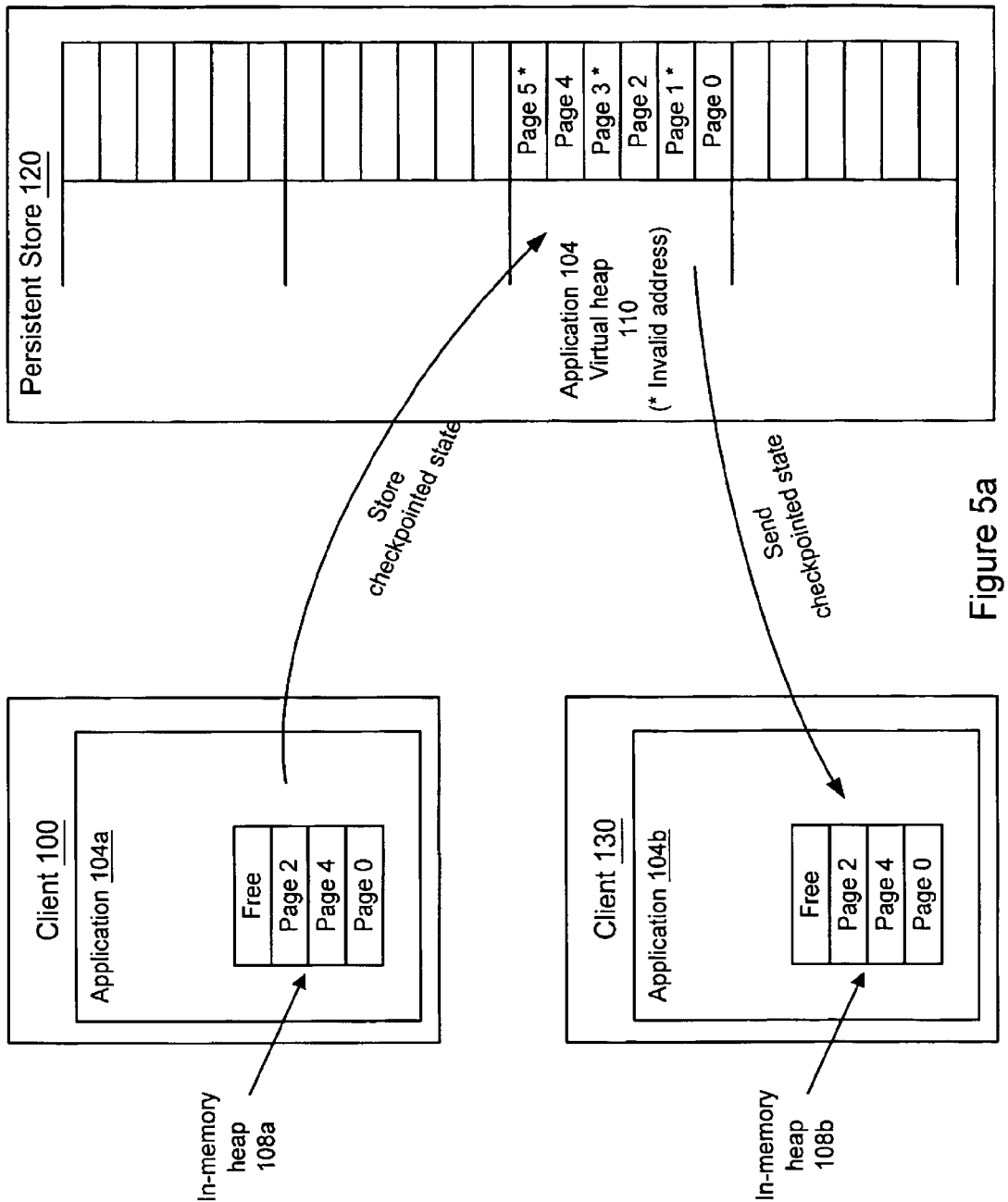
FIG. 5a is a block diagram illustrating an application migration process with a stored state from a first process sent from a persistent store to a second process according to one embodiment of the invention.
Figure 5B:
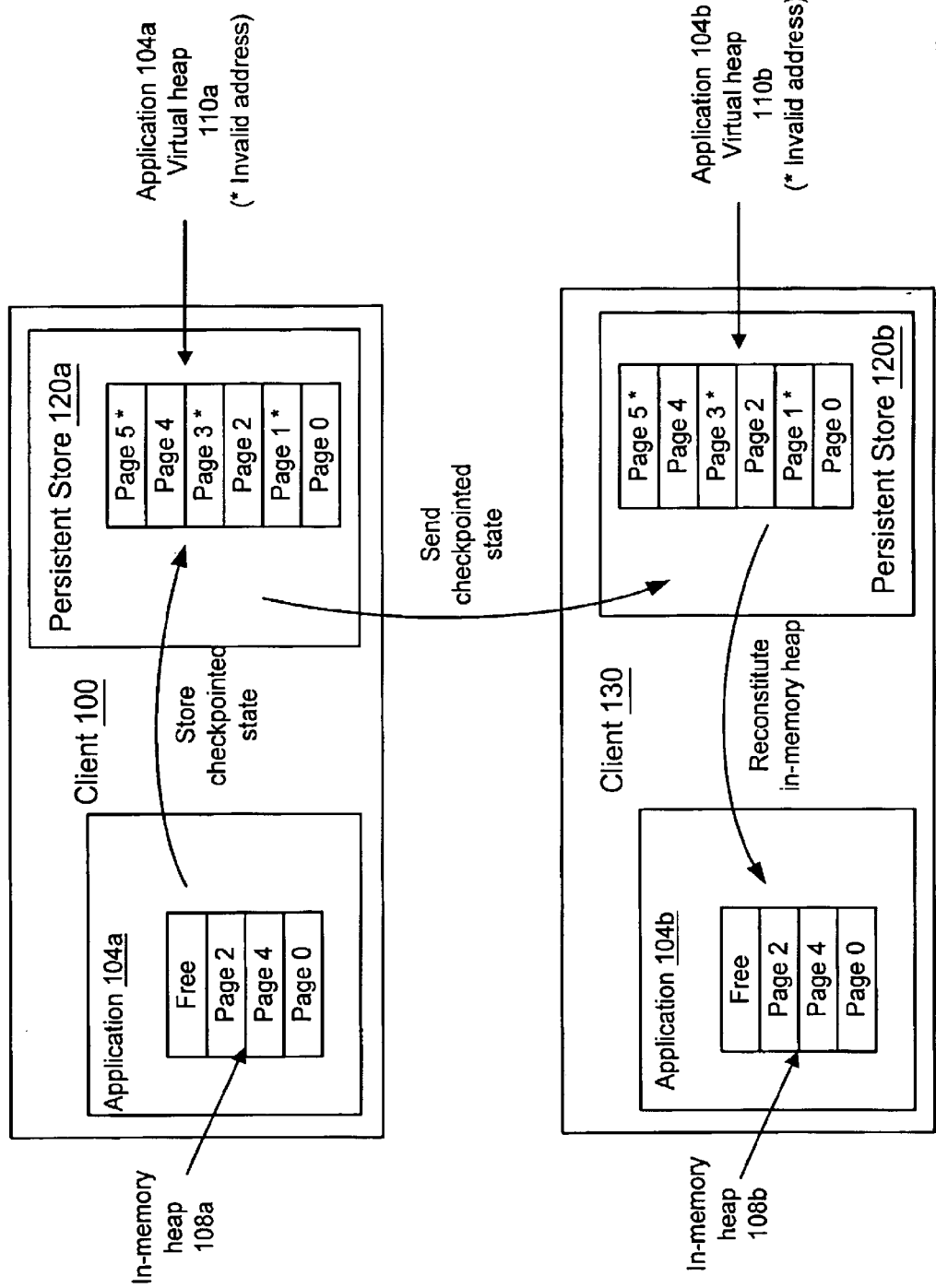
FIG. 5b is a block diagram illustrating an application migration process with a persistent store for each process according to one embodiment of the invention.

FIGS. 5a and 5b—Application Migration

The embodiments of an application migration processes as illustrated in FIG. 5a and 5b, and other embodiments not illustrated, may provide for migrating Java applications from one machine to another on a network or between devices when at least one of the devices may not be connected to a network. In other embodiments, non-pure Java applications and/or non-Java applications from one machine to another on a network or between devices when at least one of the devices may not be connected to a network. In order to handle the problem of migrating the external state of an application, migratable applications may use a Network Service Connection System such as Jini or a Compact Network Service Connection System (CNSCS) for accessing resources external to the applications, referred to as services. Services may be local (on the device within which the application is running) or remote (on other devices connected to the device via the network). Local services may include system resources on the device within which the application is running. These local or remote services may be leased by an application using an NSCS or CNSCS. Thus, in one embodiment, the external state of the application may be represented by one or more leases to local and/or remote services, including system resources. Other embodiments may use other methods for accessing external resources that allow for the preservation of external state during migration.

In one embodiment, each application on a system is separated from other applications, and is thus migratable separately from other applications. In one embodiment, each application on a system may have an in-memory heap serving as "physical" memory that is being used for the current execution of the application, a virtual heap that may include the entire heap of the application including at least a portion of the. runtime environment of the virtual machine, and a persistent heap or store where the virtual heap may be checkpointed. In one embodiment, the virtual heap and the persistent heap may be combined in one memory (the virtual heap may serve as the persistent heap). In another embodiment, the virtual heap may be checkpointed to a separate, distinct persistent heap. The combination of the in-memory heap, the virtual heap, and the persistent store may be referred to as the "virtual persistent heap." In yet another embodiment, there may be sufficient memory available for the in-memory heap so that a virtual heap is not required to run the application; in this embodiment, only an in-memory heap and a persistent heap on the store may be present for an application One embodiment of a method for migrating an application may include:

Checkpointing the application to its persistent heap. In addition, any current leases to external services and/or resources may be expired.

Packaging the persistent state of the application in the persistent heap and sending the persistent heap for the application to the node where the application is to migrate. In one embodiment, a transaction mechanism is used, where the application's entire persistent state may be copied atomically as a "transaction" and committed as having migrated on both the sending and receiving nodes.

Reconstituting the state of the application into a new persistent heap (may be a virtual persistent heap) on the node where the application migrated.

Re-establishing leases to external services and/or resources for the application.

The application resuming execution in the persistent heap on the node where it migrated.

In one embodiment, since processes that migrate away from a node may migrate back after minor state changes on the node where they migrated (e.g. updated a page of a document), a versioning mechanism may be used whereby nodes where an application once lived may cache a previous state, and thus may avoid sending over the network a state that hasn't changed.

Information on the current leases for the application may also be packaged and sent to the new node where the application is to migrate. The information may be used in re-establishing the leases on the new node. In one embodiment, the lease information may be maintained in a gate structure. Examples of gate structures for a CNSCS is described in U.S. Provisional Patent Application No. 60/209,140 to Slaughter, Saulpaugh, Traversat, Abdelaziz, Duigou, Joy, and Pouyoul, titled "DISTRIBUTED COMPUTING ENVIRONMENT", filed Jun. 2, 2000, which was previously fully incorporated by reference in its entirety, and in U.S. Provisional Patent Application No. 60/209,430 to Slaughter, Saulpaugh, Traversat, Abdelaziz, Duigou, Joy, and Pouyoul, titled "DISTRIBUTED COMPUTING ENVIRONMENT", filed Jun. 2, 2000, which was previously fully incorporated by reference in its entirety, and in U.S. Provisional Patent Application No 60/209,525 to Slaughter, Saulpaugh, Traversat, Abdelaziz, Duigou, Joy, and Pouyoul, titled "DISTRIBUTED COMPUTING ENVIRONMENT", filed Jun. 2, 2000, which was previously fully incorporated by reference in its entirety.

In addition, a user interface (UI) may be provided to manage application checkpoints. Functions the UI may allow the user to perform may include, but are not limited to, the following:

Browse the store.

Select an application checkpoint to restart.

Suspend the current application.

Remove an application checkpoint.

FIG. 5a is a block diagram illustrating an embodiment of an application migration process where the original application 104a and the migrated application 104b may use the same virtual heap 110 in persistent store 120. In FIG. 5a, the in-memory heap 108 for application 104a executing on client system 100 is checkpointed to persistent store 120. The checkpointing may be performed as an atomic transaction. The store checkpoint may include one or more of the following states that may be made permanent to the store:

All dirty user pages since the beginning of the transaction.

All dirty system pages since the beginning of the transaction.

The current state of non-heap (for example, virtual machine) internal structures (thread contexts, pointer to main structure in the heap such as classes, constant pool, etc.).

Any current leases to external services (for example, services leased via an NSCS such as Jini or a CNSCS) may be expired. In one embodiment, expiration of current leases may be required prior to migration. In one embodiment, expiration of current leases is not required before checkpointing the application.

The checkpointed persistent state of the application 104 stored in persistent store 120, including user pages, system pages, and the current state of non-heap structures, is packaged and sent to the client system 130 where the application 104a is to migrate. In this step, a transaction mechanism may be used, where a process's entire persistent state is copied atomically and committed as having migrated on both the sending and receiving client systems. In one embodiment, since processes that migrate away from a client system may be expected to migrate back after only relatively minor state change on the client system where they migrated (e.g. updated a page of a document), a versioning mechanism may be used whereby nodes on which an application once lived may cache previous states and avoid sending over the network a state that hasn't changed.

The packaged and sent state is received and reconstituted on client system 130, and application 104b resumes running on the new client system. A new in-memory heap 108b may be allocated for application 104b including the checkpointed user and system pages. The current state of non-heap structures on client system 130 may be set from the. received checkpointed state. Required leases of services may be reestablished for the application. The application 104b then may resume running in the heap 108b on the client system 130 where it migrated. Application 104b may continue to use persistent store 120 for its virtual heap or may establish a new virtual heap in another persistent store on client system 130 or on another server providing persistent store space on the network.

FIG. 5b illustrates an embodiment where client 100 comprises a persistent store 120a used by application 104a to store virtual heap 110a. When migrating application 104a to client 130, a checkpointed state of application 104a may be sent to client 130. On client 130, a new virtual heap 104b may be established in persistent store 120b, a new in-memory heap 108b may be established, and application 104b may resume executing on client 130 from the checkpointed state of application 104a.

Figure 6:
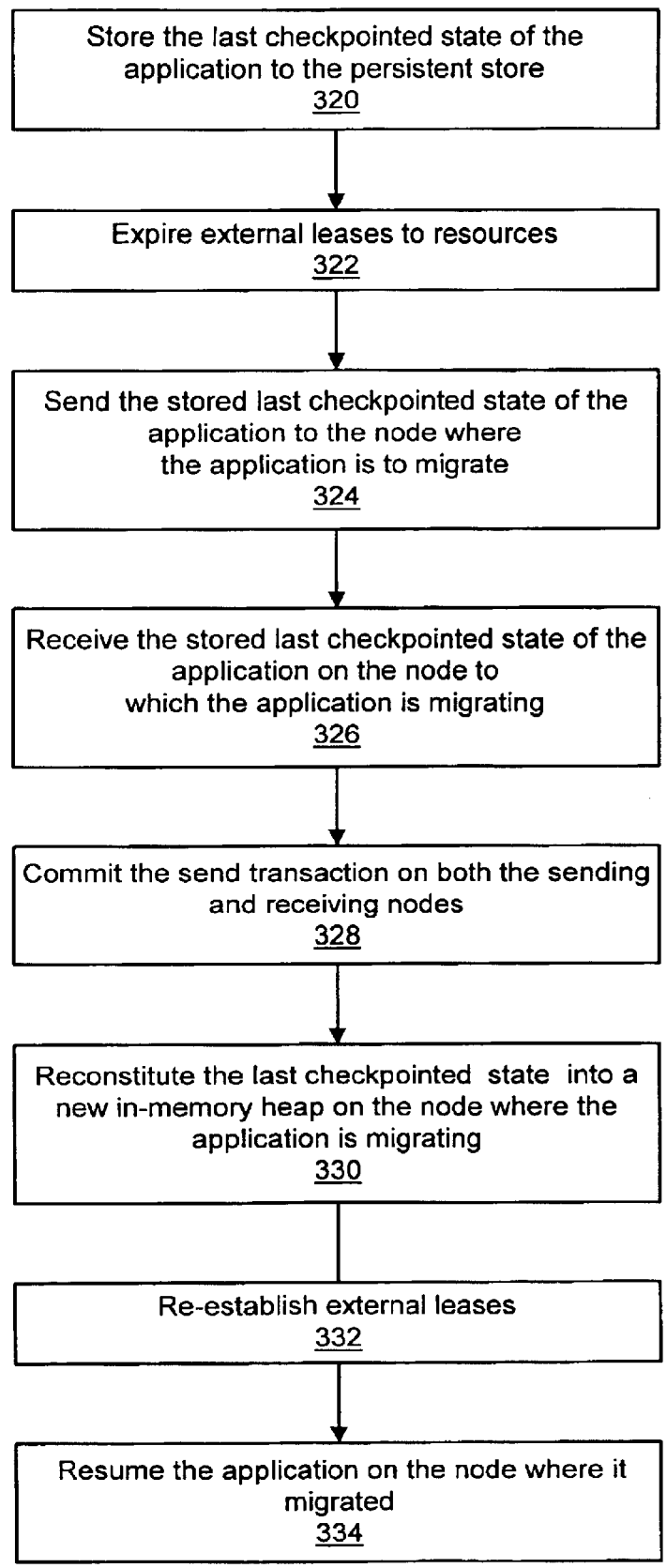
FIG. 6 is a flowchart illustrating a method for migrating an application according to one embodiment of the invention.

FIG. 6—A Method for Migrating an Application

FIG. 6 is a flowchart describing a method for migrating processes, including applications, from one client system to another according to one embodiment of the invention. Client systems may be "real" systems such as Windows 9x/NT systems or virtual machines such as Java Virtual Machines running on top of other systems. In one embodiment, each application may be independent from other applications on the system, and thus may be migratable separately from other applications. In one embodiment, each application on a particular client system will have an in-memory heap where it executes and a persistent heap where it can be checkpointed before being migrated.

In step 320, application 104 executing on client system 100 is checkpointed to its persistent heap 110 in persistent store 120. The store checkpoint may include one or more of the following states that may be made permanent to the store:

All dirty user pages since the beginning of the transaction.
All dirty system pages since the beginning of the transaction.
The current state of non-heap (for example, virtual machine) internal structures (thread contexts, pointer to main structure in the heap such as classes, constant pool, etc.).

A "user page" includes application-specific data or executable code. A "system" page includes operating system and/or virtual machine data or executable code that is not application-specific.

In step 322, current leases to services (for example, services leased via an NSCS such as Jini or a CNSCS) may be expired on client system 100. In one embodiment, all current leases must be expired before migration.

In step 324, the most recently checkpointed persistent state of the application 104 in persistent heap 120 is packaged and sent to the client system 130 where the application 104 is to migrate. In step 326, the packaged checkpointed state of application 104 is received on the client system 130. In one embodiment, a transaction mechanism may be used, where a process's entire persistent state is copied atomically and committed as having migrated on both the sending and receiving client systems in step 328.

In step 330, the received packaged state is reconstituted on the client system 130 where the application 104 is migrating. Required leases of local and/or remote services may be re-established for the application 104 in step 332. In one embodiment, one or more of the leases expired in step 322 maybe re-established. In one embodiment, the received packaged state include information describing the one or more leases expired in step 322, and this information on the leases may be used in step 332 in re-establishing the leases. In one embodiment, the reestablished leases may include leases to system resources on the device to which the application is migrating. In step 334, the application 104 then may resume running using heap 108 on the client system 130 where it migrated. The migrated application 104 may continue to use the virtual heap 110 that was used by application 104 on client system 100 prior to migration, as illustrated in FIG. 5a. Alternatively, a new virtual heap 110 may be established for application 104 on client system 130, as illustrated in FIG. 5b.

Figure 7:
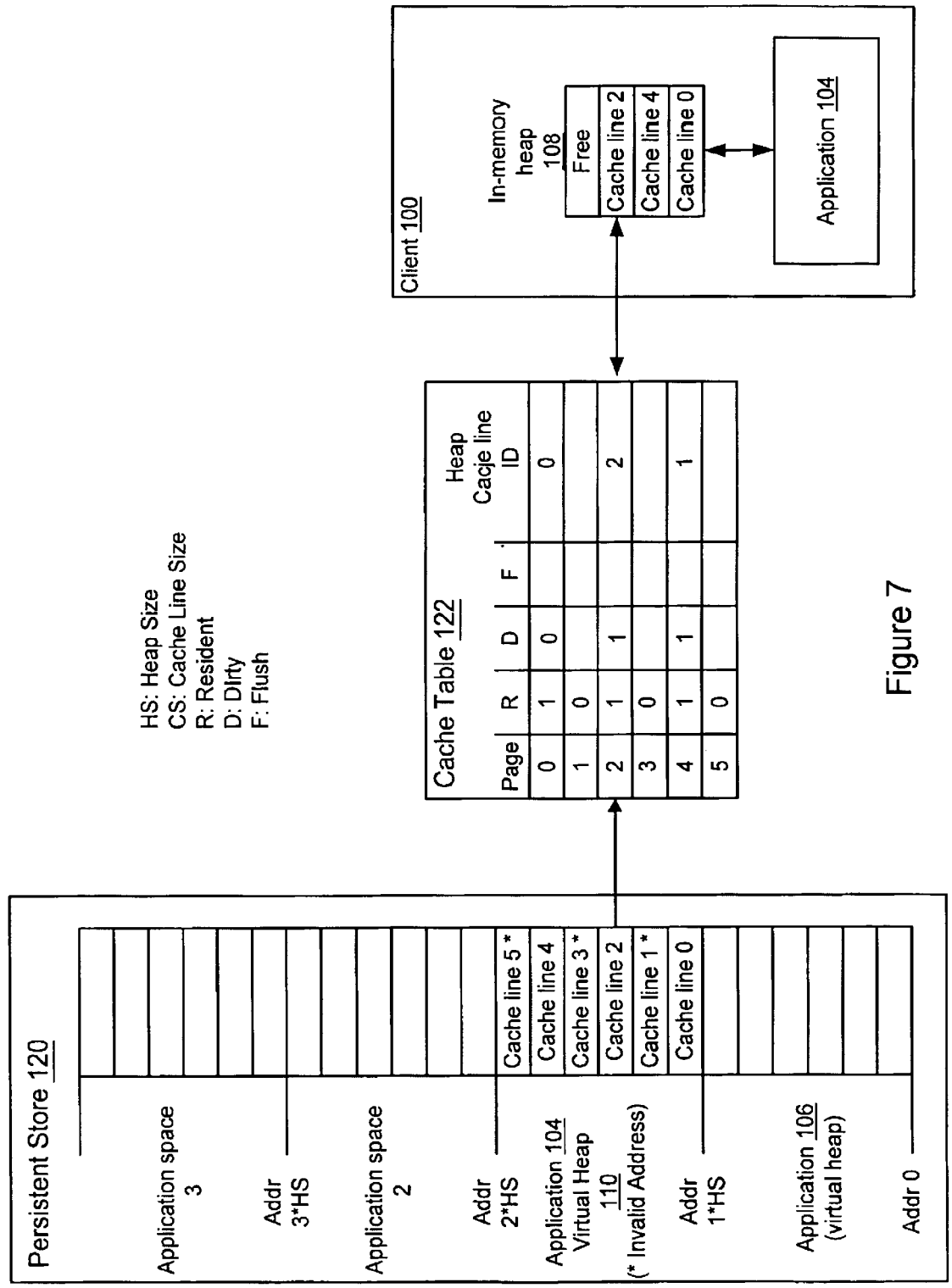
FIG. 7 is a block diagram illustrating virtual persistent heap architecture using cache lines according to one embodiment of the invention.

FIG. 7—Virtual Persistent Heap Architecture Using Cache Lines

A feature of the virtual persistent heap is the method used to cache portions of the virtual persistent heap into the "physical", in-memory heap. The virtual persistent heap may include a caching mechanism that is effective with small consumer and appliance devices that typically have a small amount of memory and that may be using flash devices as persistent storage. The caching strategy may achieve a lesser amount of caching and may improve locality among elements of the virtual persistent heap that are cached in the physical heap, thus reducing caching overhead. FIGS. 2 through 5 illustrate embodiments that use a "page" as a level of granularity for the virtual persistent heap caching mechanism.

FIG. 7 is a block diagram illustrating an embodiment of a virtual persistent heap architecture substantially similar to the embodiment illustrated in FIG. 2. Application 104 may be executing in client system 100. Application 104 may be using in-memory heap 108. Persistent store 120 may reside on a server on the network to which client system 100 has access, or alternatively may be located in a local non-volatile memory on the system that application 104 is executing on. Cache table 122 may reside on the same system as application 104 or alternatively may reside on another system on the network.

The embodiment illustrated in FIG. 7 includes a caching mechanism in which the virtual persistent heap is divided into cache lines. A cache line is the smallest amount of virtual persistent heap space that can be loaded or flushed at one time. Caching in and caching out operations are used to load cache lines into the heap or to flush dirty cache lines into the store. In general, the definition of a "page" as used in FIGS. 2 through 5 includes a cache line. In other words, a cache line is a size of page. In other embodiments, object granularity may be used in a virtual persistent heap. In these embodiments, caching in and caching out operations may be performed on objects that may be created by the application.

A level of object locality in a cache line may be achieved to reduce heap waste by the use of object caching nurseries and a generational garbage collector as described below. Different cache line sizes may be used for different regions of the heap. Cache lines may provide a natural path for porting the virtual persistent heap to cache based Memory Management Unit (MMU) architectures, and may allow address translation from the virtual persistent heap to the heap to be performed in hardware.

In one embodiment, all heap references may be kept in one address space (the virtual persistent heap address space). The address translation is therefore simplified, and may require no "swizzling" of virtual references into in-memory heap references when manipulating objects in the heap. In one embodiment, having a single address space may allow a single garbage collector to run on the virtual persistent heap space. If a single address space is not used, two or more garbage collectors, may be required, for example, one running on the virtual persistent heap and one running on the in-memory heap.

The term "virtual persistent heap" may be used to refer to the entire virtual heap image saved in the persistent store. The terms in-memory heap or heap may be used to refer to the portion of virtual heap currently cached in memory. The term cache line may be used to refer to the smallest caching-in and caching-out granularity. A cache line corresponds to the smallest amount of data that can be loaded or flushed from the in-memory heap at one time. The in-memory heap and the virtual persistent heap may be divided into fixed size cache lines, or alternatively the heaps may be divided into groups of cache lines with differing cache line sizes. The virtual persistent heap size may be a multiple of the maximum in-memory heap size, and an offset-based schema, such as that illustrated in FIG. 4, may be used to convert virtual persistent heap addresses into in-memory heap addresses.

In one embodiment, references in the virtual persistent heap and the in-memory heap structure may be kept as virtual persistent heap addresses. There may be no updates to physical heap references when heap references are manipulated. The address translation from the virtual persistent heap address space to the in-memory heap location may be done using a cache table entry.

In a cache line based system, the cache line size may be increased to reduce the cache table size. Increasing the cache line size may permit the grouping of multiple objects into a single cache line. In this case, a single cache table entry may play the role of multiple object handle entries (one handle for each object in the cache line). Grouping objects into a single cache table entry may allow the reduction of the memory footprint required for a handle table, as there may be fewer handles. Updating a single object in the cache line may require the writing of the entire cache line (all objects in the cache line). Alternatively, reducing the cache line size allows fewer objects to be stored in a cache line, thus reducing caching granularity. This approach may increase the cache table size. The cache line size may be adjusted accordingly based upon memory constraints on the device on which the cache line based system is implemented.

On each virtual persistent heap reference (read or write), read/write barriers may be used to verify the validity of the address (i.e. to check if the corresponding cache line is resident in the heap), and to translate it into the current heap location.

In one embodiment, objects in the virtual persistent heap may maintain references to other objects via a valid or invalid address. A valid address may mean the corresponding address is resident in the in-memory heap. An invalid address may mean the corresponding address is not resident in the in-memory heap.

Caching Considerations for Flash Devices

Using cache line addressing, reads may be done at a very small granularity (for example, 2 bytes). Bringing a cache line into the in-memory heap, rather than a single object, means that more objects may be brought into the heap than needed. For example, a cache line may include two objects, only one of which may be required by the application. Caching the cache line in the in-memory heap may cache both the required object and the non-required object. This may be exacerbated if there is bad object locality (i.e., if unrelated objects are in the same cache line). If the cache line is too big, many objects read in may never be referenced. Cache lines may also waste heap space if the lines are not full. For example, an average object size for an application may be 50 bytes, and a cache line size may be 4Kbytes. If 40 objects are resident in a 4Kbyte cache line in this example, approximately half of the cache line may be unused.

Flash memory writes are typically destructive, and are therefore preferably minimized. Flash devices may use relatively large block writes (for example, 128 Kbytes). In one embodiment, the cache line size may be a multiple of the flash block write size for optimum performance. In one embodiment, the cache line size may be equal to the block write size. In one embodiment, a cache line flush may write the entire line (all objects in the line).

From the above, it is evident that cache lines for reads may be small and cache lines for writes may be large. For example, read cache lines may be 4Kbytes and write cache lines may be 128Kbytes. To satisfy both requirements, different nursery regions in the heap may be used to combine objects with different flushing policies. Scatter/gather operations may also be used to combine dirty objects into cache I/O buffers, so that only updated objects are written, allowing for larger writes.

Caching may provide a simple scheme to load and flush data between the store and the in-memory heap. In one embodiment, a cache table and offset based address translation may be used to convert virtual persistent heap references into in-memory heap references. Successive caching and garbage collection compaction cycles may improve spatial locality so that cache lines may contain related objects. This may help reduce heap waste and improve performance due to less caching. Smaller cache line regions may also be used to reduce heap waste.

Flushing to a flash device may include a scatter/gather step to combine dirty objects into preallocated cache I/O buffers, so that a minimum number of writes are performed. In one embodiment, only dirty objects are written to increase the. life of the flash. This may be combined with a log-based store and atomicity for store transactions to maintain the consistency of the image of the virtual persistent heap stored in the persistent device.

Using cache lines and a cache table may be an improvement over the use of a Resident Object Table (ROT) to keep track of objects resident in the heap. A ROT occupies a relatively large amount of heap space (an entry for each resident object vs. an entry for each cache line). The cache line approach may uses significantly less heap space than an approach using object granularity.

In one embodiment, cache lines may be "colored" by adding the notion of systems and user lines. For instance, core virtual machine classes loaded from the primary loader shared by all applications can be allocated into system cache area. In addition, read-only objects can be placed into a read-only area.

The following are examples of types of operations that may occur on a virtual persistent heap cache line:

Cache Hit: a reference is made to a valid cache line in the virtual heap address space of the application. The in-memory heap currently contains the cache line.
The cache table contains the mapping of the cache line into the heap.

Cache Miss: a reference is made to an invalid cache line in the virtual heap address space. The in-memory heap currently does not contain the cache line. A cache miss occurs. The cache line must be loaded from the virtual heap in the store into a free heap location in the in-memory heap.

Cache Flush: The dirty cache line was put in the flushing queue. The write lock for the cache line is acquired so that no further writes may proceed until the line is flushed to the store. When flushing is completed, the write lock is released.

Cache Eviction: The cache line is evicted from the heap. If the cache line is dirty, the cache needs to be flushed to the store. When completed, the corresponding cache table entry may be freed.

To help provide efficient address translation, the application virtual heap size (i.e. Kernel+all user information) may be a fixed multiple of the in-memory heap size. Each application virtual persistent heap may be stored at a multiple heap size offset in the store. The address translation may involve subtracting a fixed heap size multiple. The cache table may maintain the mapping of the virtual persistent heap cache line into an in-memory heap location.

The above caching approach may add a cache table indirection to each object reference. The cache table indirection is substantially similar to object handle indirection. For instance, a cache line set to contain a single object is similar to a traditional virtual machine with one handle per object. Increasing the cache line size may permit the loading and flushing of multiple objects in a single cache operation. A cache table entry may play the role of multiple object handle entries (one handle for each object in the line). A benefit of grouping objects into a single cache entry is that the memory footprint required for the cache table is reduced (there are fewer handles). This is beneficial for small memory devices. If too many objects are grouped into a cache line (making the cache line too big), then updating a single object in the line may require flushing the entire cache line (all objects in the line). Reading a single object also may require loading the entire cache line. Using cache line handles rather than object handles may provide the ability to tune the implementation to fit the memory footprint requirement of the targeted device. The cache line size determines the amount of space required for the cache table. Larger memory environments may use smaller cache lines. Smaller memory environments may use relatively large cache lines.

The cache table 122 may maintain one or more of the following entries for each cache line of the active application virtual heap:

Type (User or System): The type is used to select the flushing and checkpointing policy used to eject and flush the cache line into the persistent store 120. For example, system cache lines may be pinned in the heap 108 and cannot be evicted.

Resident (TRUE or FALSE): The resident entry maintains the heap residency state of the cache line. If TRUE, the cache line is resident in the heap 108.

Dirty (TRUE or FALSE): Used to keep track of any write/modification to the cache line. If TRUE, the cache line is dirty.

Flushing (TRUE or FALSE): Only used for dirty lines. Indicates the cache line is in the checkpoint queue. If TRUE, the cache line is in the list of lines that have been requested to be checkpointed to the store.

Length: Length of the cache line. The length may be kept as the multiple of the minimum cache line size supported.

Heap Cache Line ID: Specifies the location of the cache line in the heap 108.

Read-only/static core/virtual machine objects may be located into pinned and read-only system cache lines. In one embodiment, the objects are tagged by the primary class loader. These classes are typically not loaded twice. All read/write core/virtual machine objects may be located in the user cache area. All user objects may be allocated in the user heap area.

A cache line may be in one of the following states:

Empty: The cache line has been freed or has not been allocated, and is "free space" in the virtual persistent heap. One embodiment may preallocate space in the store 120. Another embodiment may not preallocate space in the store 120.

Resident: The cache line has been newly allocated or has been loaded from the store 120. No changes have been made yet, or the latest changes have been flushed to the store 120. The copy in the heap 108 is synchronized with the copy in the store 120.

Dirty: A write to the cache line has been performed and the changes have not been written back to the store 120. No request for flushing the cache line has been made.

Waiting to be flushed: The cache line is in the flushing queue. The cache line is currently write-locked, no further write can occur until the line has been flushed.

Persistent: The cache line has been ejected. The line is not resident in the in-memory heap 108.

Figure 8:
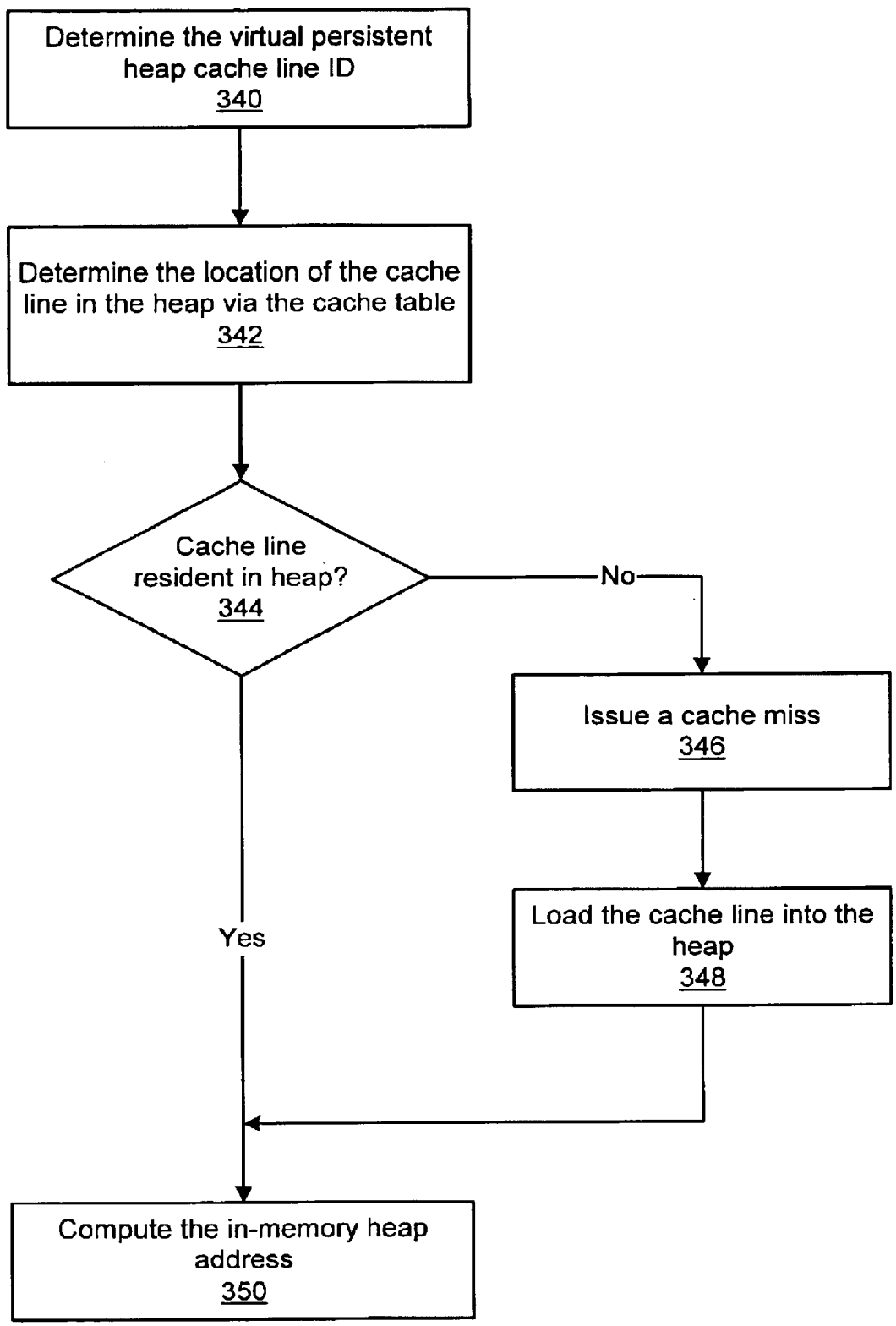
FIG. 8 is a flowchart illustrating a computation method for the in-memory heap cache line addresses according to one embodiment of the invention.

FIG. 8—In-memory Heap Cache Line Address Calculation

FIG. 8 is a flowchart illustrating one embodiment of a method for translating virtual heap cache line references to in-memory heap cache line references. In step 340, the virtual persistent heap cache line id may be determined. The following function may be used:

$$CacheID = Sadd - (AppID * HS) << CacheLineS$$

Sadd: The virtual heap cache line reference address to be translated

AppID: The current application ID used to select the virtual persistent heap. For example, in FIG. 7, application 104 may have an application ID of 1.

HS: The virtual heap size (may be a multiple of the in-memory heap size)

<<: Left bit shift operator (may be left or right shift depending on bit order representation in the system)

CacheLineS: Cache line bit shift

In step 340, first, the application ID may be multiplied by the virtual heap size to get the base address of the virtual heap for the application. Second, the base address of the virtual heap may be subtracted from the virtual heap cache line reference address to produce an address offset from the base address. Third, the address offset may be shifted to remove the bits containing the in-cache line address information. For example, if a cache line comprises 256 addressable bytes, the address may be shifted 8 bits. The result of the shift is the cache line ID for the virtual heap cache line reference.

In step 342, the location of the cache line in the in-memory heap may be determined via the cache table:

$$HeapCacheID = cacheTable\ (CacheID)$$

For example, referring again to FIG. 7, if the result of step 340 is virtual heap cache line 4, looking up the virtual heap cache line 4 row in cache table 122 produces a heap cache line ID of 1.

In step 344, if the cache line is not resident in the in-memory heap, a cache miss may be issued in step 346, and the cache line may be loaded into the in-memory heap in step 348. In step 350, the in-memory heap address may be calculated. An example of a method for computing the in-memory heap address is:

$$Hadd = HeapCacheID * CacheLineS + Sadd\ \&\ CacheLineMask$$

CacheLineS: Cache line size
Sadd: The original virtual heap page reference address
CacheLineMask: Cache line bit mask
&: Bitwise AND operator First, the heap cache line ID produced in step 342 may be multiplied by the cache line size to produce the base address of the in-memory heap cache line. The original virtual heap cache line reference address may then be ANDed with a cache line bit mask to produce the bits containing the in-cache line address information. The in-cache line address information may then be added to the base address of the in-memory heap cache line to produce the in-memory heap address.

Figure 9:
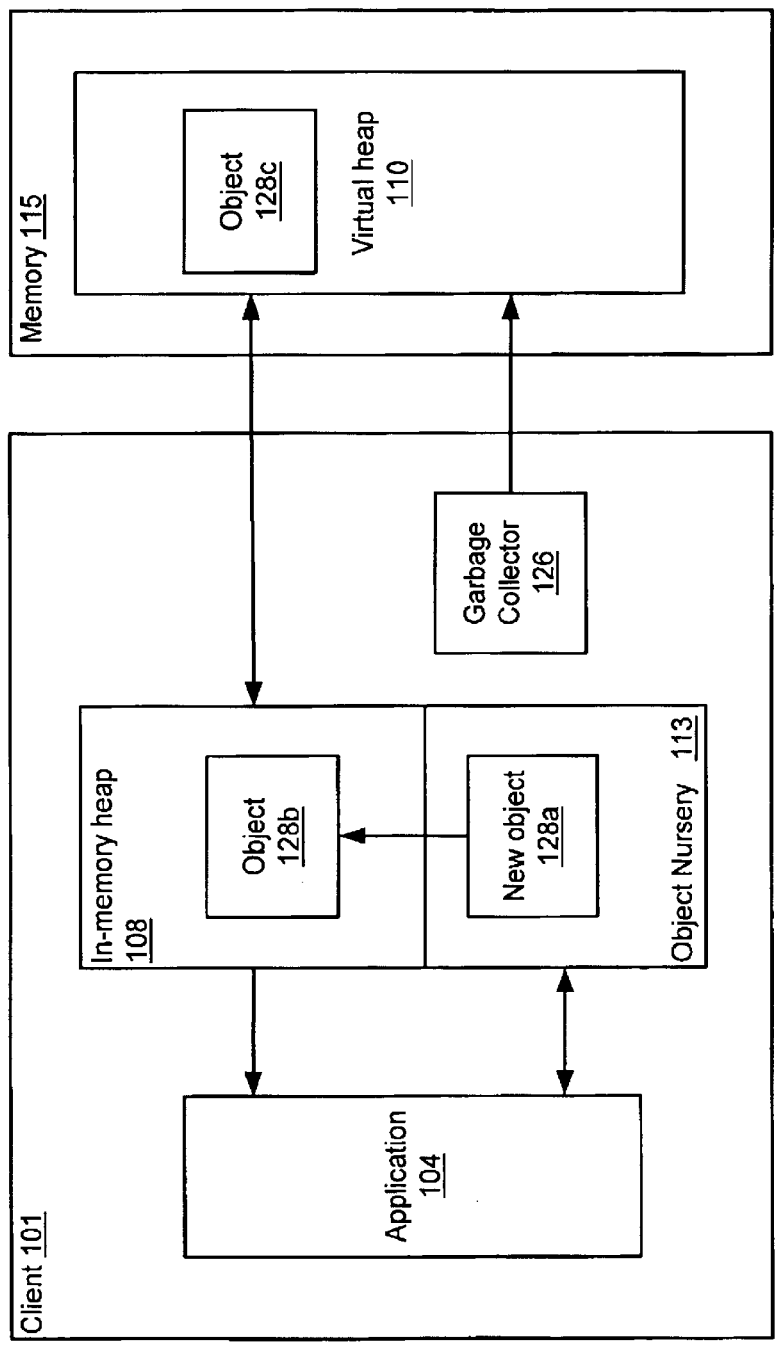
FIG. 9 is a block diagram illustrating a device with virtual heap, object nursery and garbage collector according to one embodiment of the invention.

FIG. 9—A Device with Virtual Heap, Object Nursery and Garbage Collector

FIG. 9 illustrates a device similar to those illustrated in FIGS. 1*a*–1*d*. One embodiment includes a client 101 and memory 115. Client 101 and memory 115 may be comprised in a device. Alternatively, client 101 may be comprised in a device, and memory 115 may be located externally to the device. The device may be a computer platform with operating system, such as a PC or laptop computer running an operating system such as Microsoft Windows 9x/NT, or a consumer or appliance device, for example, a cell phone or PDA. Client 101 may be a virtual machine such as a JVM or KVM. Client 101 may be used for running applications, for example, Java applications. One or more applications may be running on client 101, with one application typically executing and one or more applications suspended. Application 104 is shown as a currently executing application.

Memory 115 may be integrated in or directly attached to the device comprising client 101. Alternatively, memory 115 may be located on a device external to and remotely attached to (for instance, via the Internet) the device comprising client 101. Memory 115 may be a volatile memory such as Direct Inline Memory Modules (DIMMs) or non-volatile storage device such as a flash memory, a hard disk, or removable disk such as a floppy disk. Memory 115 may include the virtual heap 110 for application 104. Memory 115 may also include virtual heaps (not shown) for one or more other applications.

In-memory heap 108 may be maintained in client 101 memory space, or alternatively may be maintained in memory external to client 101 memory space. In-memory heap 108 may include a portion of virtual heap 110 currently cached for use by application 104. In-memory heap 108 and virtual heap 110 may be divided into one or more sections. The sections may be sectors, pages, cache lines, or any other division of memory space. If application 104 requires code or data that is not currently in heap 108, one or more sections of virtual heap 110 may be copied into in-memory heap 108. If there is insufficient room in in-memory heap 108, one or more sections of in-memory heap 108 may be removed before copying in the new sections.

A garbage collector 126 may perform garbage collection on the virtual persistent heap on a schedule and/or when required. The virtual persistent heap is the combination of the in-memory heap 108 and the virtual heap 110. Virtual heap 110 may also be referred to as the store heap.

Garbage collection may include a compaction phase to compact memory in the heap after deleting objects from the heap. Garbage collection may be triggered by several conditions. In one embodiment, running low on heap space may trigger garbage collection to free heap space by deleting non-referenced objects and optionally compacting the heap. In one embodiment, a garbage collection may be initiated on a schedule; the schedule may be at fixed or varying intervals. In one embodiment, garbage collection may be triggered by an excessive amount of caching. An excessive amount of caching may indicate poor object locality, degrading system performance.

Poor object locality may occur when correlated objects are not stored in the same section of the heap. For example, poor object locality may occur when two or more objects in a section of the heap are not highly correlated, when two or more correlated objects are stored in different sections of the heap, or in a combination of the two conditions. Correlated objects are objects that may be used during execution of a function of the application. For example, a window used to display images and a toolbar used to manipulate the images may be stored as different objects in an image processing application. For good object locality, the objects may be stored in the same page of the heap. With poor object locality, the window and toolbar objects may be stored in different pages. With poor object locality, while a user is editing an image in the window, the page containing the window object may be cached in the in-memory heap 108 while the user is directly manipulating the object. If there is insufficient room in the in-memory heap, the page containing the menu bar may be stored in the virtual heap 110. When the user goes to the toolbar to select another image editing tool, the page containing the window object may be flushed to the virtual heap 110, and the page containing the toolbar object may then be cached to the in-memory heap 108. After the user has selected the tool and returns to the window to edit the image, the page containing the toolbar object may be flushed and the page containing the window object may be cached. The constant swapping of pages between the in-memory and the virtual heap may significantly degrade performance of the system, forcing the user to wait while the operation completes.

Garbage collecting the heap to remove non-referenced pages, and then compacting the heap, may improve object locality. Compacting the heap may include moving objects from one section of the heap to another section in which heap space was freed during garbage collection by deleting objects in the section, or by moving objects from the section to another section. Moving objects from one section to another section of the heap may result in correlated objects that were in different sections of the heap being stored in the same section of the heap. In one embodiment, during the compaction phase, the objects in the heap may be examined to determine correlated objects, and an attempt may be made to group as many correlated objects as possible in the same section of the heap. This may include moving non-correlated objects out of a section of memory and moving correlated objects into the section of memory.

The garbage collector 126 may start at the root of the virtual persistent heap and flag code and data that are referenced (i.e. need to be kept in the virtual persistent heap). Then, all code and data not flagged may be removed from the virtual persistent heap. Alternatively, the garbage collector 126 may flag code and data that are not referenced, and then may remove the flagged code and data. In one embodiment, the code and data may be comprised in objects, and the garbage collector may examine and flag for removal objects in the heap that are not referenced.

In one embodiment, objects are created by the application in the in-memory heap 108, and may be later flushed to the virtual heap 110 to free space in the in-memory heap 108 for the creation of more new objects, or for requested objects to be cached from the virtual heap 110 into the in-memory heap 108. In one embodiment, for the application to access an object, the object must be in the in-memory heap. A request by the application for an object not currently in the in-memory heap 108 may trigger a heap read operation to move the object from the virtual heap 110 to the in-memory heap 108.

An object in the heap may reference one or more other objects in the heap, and in turn may itself be referenced by one or more other objects in the heap. If an object is referenced, the object may be considered to be currently in use by the application. Non-referenced objects may be considered as not currently in use by the application. Non-referenced objects may be candidates for garbage collection.

In one embodiment, a heap may be divided into sections, for example, pages or cache lines. The sections of the heap may be grouped into sets of two or more sections, or working sets, for heap operations such as garbage collection. Sections of the heap may include structures for managing code and data (objects) stored in the section. A structure for tracking references to objects may be referred to as an object reference table. In one embodiment, one or more object reference tables may be kept in a section of the heap. In another embodiment, one or more object reference tables may be kept in a working set for the sections of memory in the working set. In yet another embodiment, a global structure for tracking the references for all objects in the heap may be maintained external to the sections of memory and/or working sets. In still yet another embodiment, each object may include information on the objects it references and the objects that reference it. An internal reference to an object may be defined as a reference to an object from another object in the same section of the heap. An external reference to an object may be defined as a reference to an object from another object in another section of the heap. In one embodiment, to determine if an object is referenced during garbage collection, the process may examine the object reference table that comprises the reference information for the object.

In one embodiment, the virtual persistent heap may use a single address space for both the virtual heap 110 and the in-memory heap 108. A single garbage collector 126 may be run on the entire virtual persistent heap address space. The virtual persistent heap may use a single garbage collector 126, which may be advantageous for devices with memory and CPU constraints, for example, small appliance and consumer devices. Code and data in in-memory heap 108 may be flushed to virtual heap 110 prior to the start of a garbage collection cycle. Thus, the garbage collector 126 may only need to perform garbage collection on virtual heap 110.

Garbage collection may cause the virtual persistent heap to become fragmented so that a large object can't fit in available free space. An embodiment of a garbage collection method may include a compaction phase to reduce or eliminate this fragmentation. The compaction phase may also improve object locality. is The virtual heap enables the running of applications that require a bigger than available in-memory heap. In one embodiment, the amount of caching is tracked, and a garbage collection cycle is induced to reduce extra caching before running out of virtual heap space in response to the tracking of the amount of caching.

Small appliance and consumer devices may use flash devices for non-volatile memory storage. Flash devices typically have special characteristics, such as large write I/O blocks (for example, 128 Kbytes) and destructive writes. In one embodiment, the number of writes performed to the device by the garbage collector 126 may be minimized to increase the life of the flash device. The garbage collector 126 for the virtual persistent heap may be implemented using working sets and/or one or more object nurseries for short life objects.

If a garbage collection method walks through the entire virtual heap address space in a single cycle, a large burst of cache load and flushing requests may be generated, particularly when the in-memory heap 108 is much smaller than the virtual heap 110. A generational-based garbage collector 126 may be used. The virtual persistent heap may be divided into working sets, and each generation of the garbage collector 126 may be confined to a working set of the virtual persistent heap. A working set may include one or more sections (pages, cache lines, etc.) of the virtual persistent heap. In one embodiment, the working set size may be the same as the size of the in-memory heap. The entire virtual persistent heap may be garbage collected in several cycles (generations) of garbage collector 126 on the working sets, and each cycle may garbage collect one or more of the working sets. Each generational garbage collection cycle may touch disjoint areas of the virtual persistent heap. A small portion of the heap may be shared to store inter-working set dependencies. References may be significantly confined to the working set region. In one embodiment, the garbage collection cycles may run at fixed intervals. Alternatively, the garbage collection cycles may run at varying intervals.

In one embodiment, a heap allocator may combine related code and data (e.g. correlated objects) in the same working set region. The generational garbage collector 126 may allow the flushing of changes before, or alternatively after, each garbage collection cycle for each working set region, and thus may avoid the caching burst of a garbage collector that walks the entire virtual heap in one cycle. The generational garbage collector 126 may allow cache load and eviction to be spread across multiple garbage collection generations.

During garbage collection, the default flushing mechanism of the virtual persistent heap may be disabled until the garbage collection is completed. Since garbage collection is likely to change the heap state and update heap structures many times, there is no advantage to generating a store checkpoint during garbage collection. For instance, a cache line is likely to be updated many times during garbage collection. Therefore, the method may wait until the garbage collection is completed to commit a store checkpoint.

In one embodiment, heap regions with different flushing policies may be used. For example, an object nursery region 113 that is not flushed where objects for use by application 104 are initially created may be used. In one embodiment, multiple object nurseries with different flushing policies may be used. Application 104 may create new code and data in nursery regions such as object nursery region 113 of in-memory heap 108. The nursery regions may not be flushed as are other regions in the in-memory heap 108. Using nursery regions may help to reduce flushing, fragmentation, and garbage collection overhead by reducing the number of newly created objects that are flushed to the virtual heap 110, since short-term, non-referenced newly created objects may not be flushed, and thus do not have to be examined and removed during garbage collection. In one embodiment, a garbage collector may use both working sets to implement a generational garbage collection policy and heap regions with different flushing policies such as nursery regions.

In one embodiment, as part of garbage collection, the objects in object nursery 113 may be examined to see which objects are referenced. In one embodiment, object reference information for the objects in object nursery 113 may be kept in an object reference table in object nursery 113. Referenced objects may be moved from object nursery 113 to other regions of the in-memory heap 108. Non-referenced objects may also be removed from the object nursery 113. "Dirty" objects, including the "new" objects moved from the object nursery 113 to the other regions of the in-memory heap 108, may then be flushed from in-memory heap 108 to virtual heap 110. Garbage collection may then remove non-referenced objects from the virtual heap 110. A compaction phase may then compact memory in the sections of the virtual heap 110 and/or the sections of the in-memory heap 108.

In object-oriented programming languages such as Java, objects may be defined as structures that are instances of a particular class definition or subclass object definition. Objects may include instances of the class's methods or procedures (code) and/or data related to the object. An object is what actually "runs" in an object-oriented program in the computer.

The object nursery region may not be flushed in the same manner as other regions of the heap 108. A number of short-lived objects may be created during the execution of an application. A relatively small number of these objects may end up in the persistent store. Using an object nursery outside the scope of normal flushing and garbage collecting to hold new objects avoids unnecessary flushing of the short-lived objects. Objects in the object nursery that are externally referenced by other objects in other regions of the virtual heap may at times be copied into "normal" heap regions to be flushed to virtual heap 110. In one embodiment, when a garbage collection cycle is run, objects referenced in the object nursery may be copied into "normal" heap regions to be flushed to virtual heap 110.

FIG. 9 shows a new object 128a created in object nursery 113 by application 104. When garbage collector 126 runs, object 128a in object nursery 113 may be examined. If the object is referenced by application 104, it is likely that the object may be used by the application 104 in the future. The object 128a may then be moved into another region of the heap 108 as object 128b. Object 128b may then be flushed to virtual heap 110 as object 128c. Thus, object 128a now exists in virtual heap 110 as object 128c. The memory for object 128a in object nursery 113 may be freed after the object 128a is moved to another region of the in-memory heap 108. Note that object 128b (a cached copy of object 128c) may remain in heap 108 while in use by application 104. When virtual heap 110 is checkpointed, object 128c will be in the persistent store. When a generation of garbage collector 126 runs on the working set of virtual heap 110 that includes object 128c, object 128c may be removed from the virtual heap if no longer used by application 104. Objects in the nursery 113 that are not referenced after a generation of garbage collection may be removed from the nursery 113.

Some embodiments may include two or more nursery regions. The regions may form a hierarchical nursery for objects. In a hierarchical nursery, an object may be created in a first nursery region. If the object "survives" in the first region (is referenced when the objects in the first nursery region are checked, such as during a garbage collection cycle), the object may be moved to a second nursery region for objects that have persisted for a while. The object may continue to be checked and moved up to "higher" nursery regions until the object is finally moved into a region of the in-memory heap 108 or until the object is no longer referenced and is deleted from the nursery regions. If the object is moved into a region of the in-memory heap 108, the object may then be flushed from the in-memory heap 108 to virtual heap 110. In one embodiment, a timestamp may be kept for a newly created object to keep track of how long it has been in a nursery region, and the object may be moved to another nursery region or out of the nursery region after a certain time has elapsed.

Figure 10A:
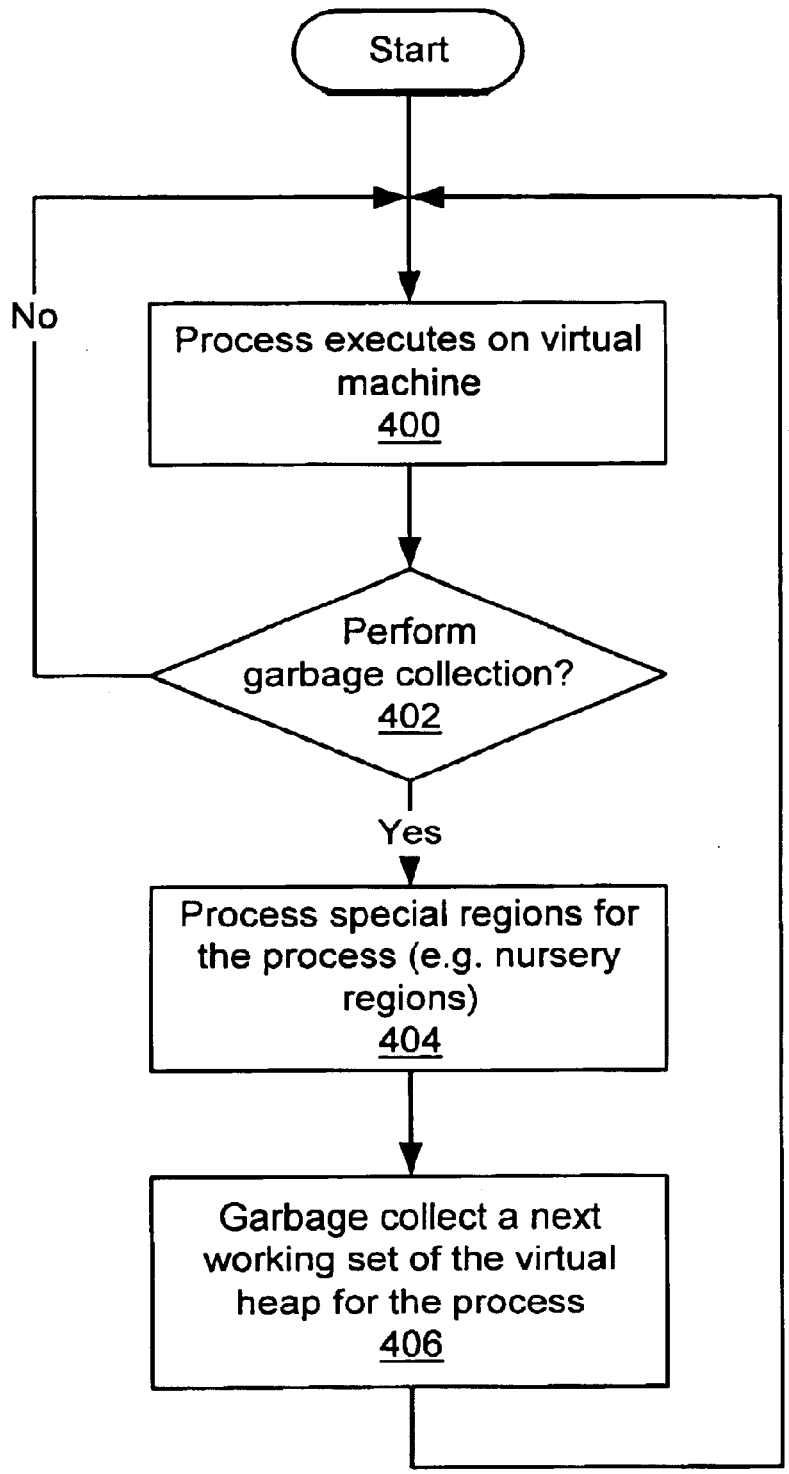
FIG. 10a is a flowchart illustrating garbage collecting a virtual heap according to one embodiment of the invention.
Figure 10B:
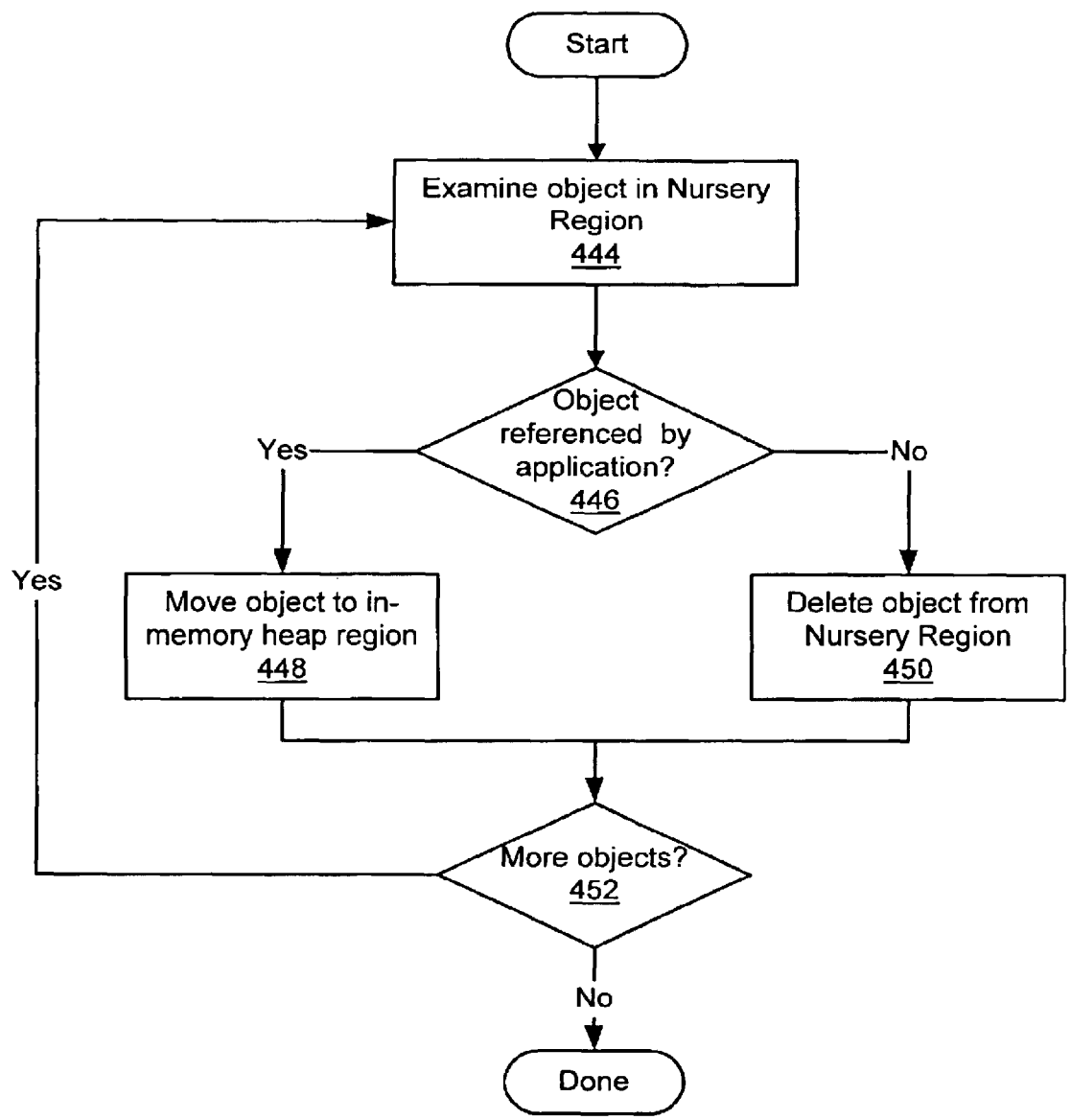
FIG. 10b is a flowchart illustrating the processing of a nursery region in a virtual heap according to one embodiment of the invention.
Figure 10C:
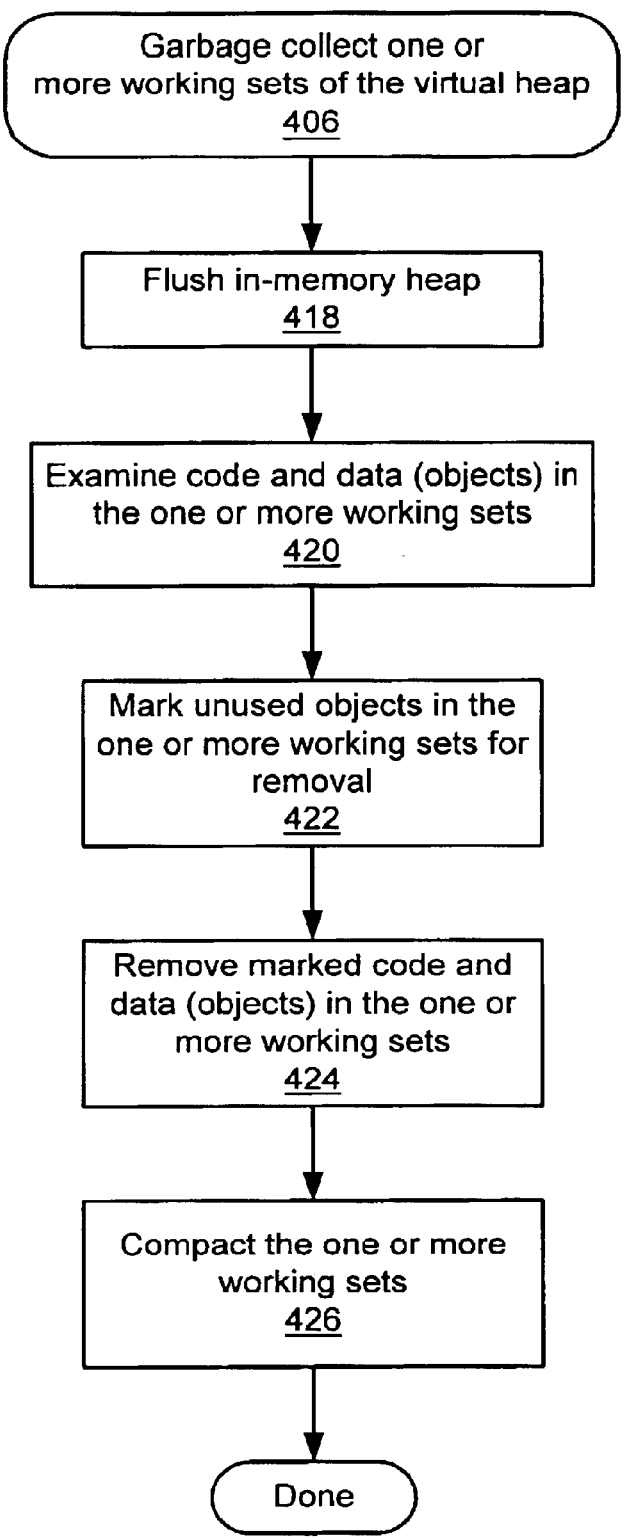
FIG. 10c is a flowchart illustrating garbage collection performed on one or more regions of a heap according to one embodiment of the invention.

FIGS. 10a through 10c—Garbage Collecting a Virtual Heap

FIGS. 10a through 10c are flowcharts illustrating embodiments of a generational garbage collector with special region processing. In an embodiment of garbage collection as illustrated in FIG. 10a, a process is executing on a virtual machine in step 400. In step 402, a virtual heap manager may determine if garbage collection is required on the virtual heap for the process. In one embodiment, garbage collection may be based on a time interval, for example, approximately every 15 seconds. In one embodiment, running low on space in the virtual heap may trigger garbage collection to free up virtual heap space. In one embodiment, an excessive amount of paging activity between store heap and the virtual heap may trigger garbage collection. The excessive amount of paging may be indicative of poor object locality in the pages; in other words, the process may be accessing two or more objects in different pages of the heap, causing some pages to be flushed from the in-memory heap so that other pages may be cached. Garbage collecting may free up space in pages of the virtual heap, which may allow the two or more objects to be compressed into fewer pages and thus requiring less paging activity.

In one embodiment, the entire virtual heap may be garbage collected in a cycle. A cycle may comprise one or more generations of garbage collection. In each generation of garbage collection, one or more working sets of the virtual heap may be garbage collected. A working set may include one or more pages of the virtual heap. In step 404, if garbage collection is required, then special regions for the process may be processed. Special regions may include one or more nursery regions. In one embodiment, new objects created by the process may be created in one or more nursery regions. In step 404, new objects that are referenced by the process may be moved to other regions of the in-memory heap 108, and the memory in the nursery region for other objects not referenced by the process may be freed. A next working set in the virtual heap for the process may then be garbage collected in step 406. In one embodiment, two or more working sets may be garbage collected in one generation of garbage collection. In another embodiment, only one working set may be garbage collected in one generation of garbage collection.

FIG. 10b is a flowchart illustrating the processing of a nursery region. In step 444, an object in the nursery region may be examined. In step 446, if the object is referenced by the process, the object may be moved to another in-memory heap region to be flushed to the persistent store in step 448. Alternatively, the object may be moved to a "higher" nursery region in a hierarchy of two or more nursery regions. If the object is not referenced by the process, the object may be deleted from the nursery region in step 450. In step 452, if there are more new objects in the nursery region that have not been examined, processing may return to step 444 to examine the next object.

FIG. 10c expands on step 406 of FIG. 10a. In step 418, pages containing "dirty" objects in the in-memory heap may be flushed to the virtual heap. In one embodiment, only pages containing dirty objects in the working set to be garbage collected in this generation of the garbage collector may be flushed in this generation. In step 420, the objects in the one or more working sets to be garbage collected in this generation may be examined. In step 422, objects that are not in use or referenced by the application may be marked for removal. In step 424, objects marked for removal from the one or more working sets may be deleted from the virtual heap. Alternatively, in step 422, objects in use may be marked, and in step 424 unmarked objects may be removed. Another alternative is to remove objects as they are found to be not in use. In step 426, the one or more working sets may be compacted. Compacting the one or more working sets may include moving one or more objects in a working set to another location in the working set, or moving one or more objects to another working set, in order to gain as much contiguous free space in the heap as possible.

Figure 11A:
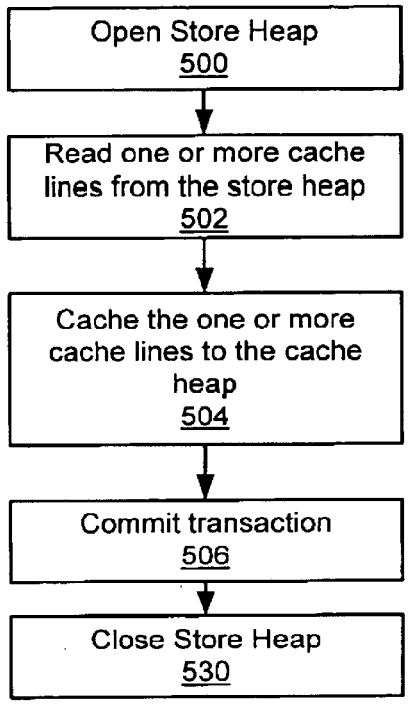
FIG. 11a is a flowchart illustrating an atomic read transaction from a persistent store for a process.
Figure 11B:
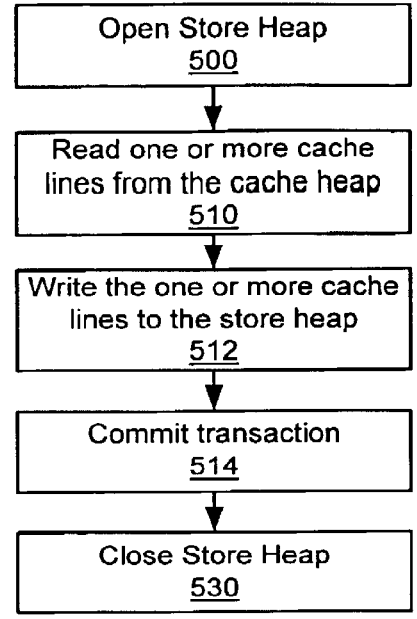
FIG. 11b is a flowchart illustrating an atomic write transaction to a persistent store for a process.
Figure 11C:
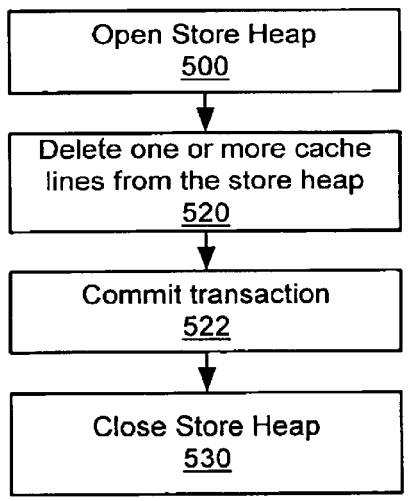
FIG. 11c is a flowchart illustrating an atomic delete transaction from a persistent store for a process.

FIGS. 11a through 11c—Atomic Transactions on a Persistent Store

A database store method and Application Programming Interface (API) may be provided for the virtual persistent heap. The API may provide mechanisms to cache portions of the virtual heap into the in-memory heap for use by the application and to flush portions of the heap out of the in-memory heap. The virtual heap may be stored in a persistent store. Thus, the database store method and API may function to manage the virtual persistent heap in the persistent store.

In one embodiment, the persistent store is composed of one or more virtual persistent heaps, with one virtual persistent heap for each application running in the virtual machine. Each virtual persistent heap may be subdivided into cache lines. The cache line is the smallest amount of data that can be read or written in the heap.

The database store API may include an interface to a set of functions for managing a virtual persistent heap in a virtual machine environment. The database store method and API may be configured to work with small consumer and embedded devices, such as Java-enabled devices, as well as larger devices supporting Java and other virtual machine environments such as PCs, laptops, etc. The functions provided by the database store API may be configured to perform transactions to manage the virtual persistent heap. At least some of the transactions may be atomic transactions. The transactions provided by the database store API may include, but are not limited to:

Open the store

Close the store

Atomic read transaction (read a set of cache lines)

Atomic write transaction (write a set of cache lines)

Atomic delete transaction (delete a set of cache lines)

Abort (stop a transaction)

FIGS. 11a through 11c illustrate several database store API transactions that may be available in embodiments of the present invention. An atomic transaction (or transaction) may be defined a sequence of information exchange and related work that is treated as a unit for the purposes of satisfying a request and for ensuring data integrity. For a transaction to be completed and data changes to be made permanent, a transaction has to be completed in its entirety. When a transaction has successfully entirely completed, the transaction is committed. Committing a transaction includes accepting all the changes made by the transaction. If the transaction does not successfully complete, the transaction may be rejected, and all data affected by the transaction may be "rolled back" to the state of the data at some earlier time, for instance, to the state of the data at the time the transaction began.

As an example of an atomic transaction, if two cache lines are being flushed from the cache and written to the persistent heap, and there is a relationship between the two cache lines that requires the two to be consistent, an atomic write transaction may be invoked from the database store API to write both cache lines. When both cache lines have been successfully read from the in-memory heap and written to the store heap, the transaction is committed and processing resumes. If the first cache line is successfully written but the second cache line fails to write, then the write of the first cache line is undone ("rolled back") and the state of the in-memory heap and virtual heap are restored to the state before the atomic write began.

FIG. 11a illustrates one embodiment of an atomic read transaction. An atomic read transaction may occur when an application requires code and/or data (objects) that are not currently in the in-memory heap, but are in the store heap. The atomic read transaction may cache the one or more cache lines including the required objects for the applications from the store heap to the in-memory heap.

The store heap may be opened in step 500. In one embodiment, the store heap may be in one of several access states including an open access state and a closed access state. In the open access state, operations such as writing, reading and deleting cache lines in the store heap may be allowed. In the closed access state, these operations may be prohibited. Opening the store heap may include changing the access state from closed to open.

Steps 502 through 506 illustrate the atomic read transaction. In step 502, one or more cache lines may be read from the store heap. The one or more lines read from the store heap may be cached in the in-memory heap in step 504. If there is insufficient memory in the in-memory heap for the cache lines, more memory may be made available in the in-memory heap by one or more of several methods. Examples of methods of making more memory available in the in-memory heap include, but are not limited to: allocating more cache lines to the in-memory heap; flushing one or more cache lines to the store heap; deleting unused or transient content from one or more cache lines; and compacting memory in one or more cache lines. In step 506, the transaction, having successfully completed, may be committed. If the transaction fails, the transaction may not be committed, and data modified during the transaction may be "rolled back" to its state prior to starting the transaction. Rolling back an atomic read may include undoing any caches of cache lines to the in-memory heap done in step 504. In step 530, the store heap may be closed. Closing the store heap may include changing the access state from open to closed.

FIG. 11b illustrates one embodiment of an atomic write transaction. An atomic write transaction may occur when there are objects to be flushed from the in-memory heap to the store heap. The objects may be "dirty" objects that need to be updated in the store heap, or may be new objects that need to be flushed to the store heap.

In step 500, the store heap may be opened. Steps 510 through 514 illustrate the atomic write transaction. In step 510, one or more cache lines including the objects to be flushed may be read from the in-memory heap. In step 512, the one or more cache lines may be written to the store heap. If there is insufficient memory in the store heap for the cache lines, more memory may be made available in the store heap by one or more of several methods. Examples of methods of making more memory available in the store heap include, but are not limited to: allocating more cache lines to the store heap; deleting one or more cache lines from the store heap; deleting unused or transient content from one or more cache lines; and compacting memory in one or more cache lines. In step 514, the transaction, having successfully completed, may be committed. If the transaction fails, the transaction may not be committed, and data modified during the transaction may be "rolled back" to its state prior to starting the transaction. In step 530, the store heap may be closed.

FIG. 11c illustrates one embodiment of an atomic delete transaction. An atomic delete transaction may occur when there are objects to be removed from the store heap, such as when the objects are non-referenced objects selected for removal from the store heap during garbage collection. The objects may be determined to be currently not in use by the application. In step 500, the store heap may be opened. Steps 520 and 522 illustrate the atomic delete transaction. In step 520, one or more cache lines containing the objects may be deleted from the store heap. In step 522, the transaction, having successfully completed, may be committed. If the transaction fails, the transaction may not be committed, and data modified during the transaction may be "rolled back" to its state prior to starting the transaction. In step 530, the store heap may be closed. The cache lines containing the objects to be removed from the store heap may be flushed from the in-memory heap prior to being deleted.

In FIGS. 11a through 11c, opening and closing the store heap may be optional. For example, if the store heap is already opened, then step 500 may not be necessary, and if other transactions are anticipated, the store heap may not be closed.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for migrating a process between devices, the method comprising:

executing the process within a first device;

storing a first state of the process executing within the first device to a persistent store;

expiring one or more leases to services for the process on the first device;

sending the first state of the process from the persistent store to a second device;

receiving the first state of the process on the second device;

reconstituting the first state of the process on the second device;

establishing the one or more leases to services for the process on the second device; and resuming the process execution on the second device.

2. The method of claim 1, further comprising:

storing one or more previous states of the process executing within the first device to the persistent store prior to said sending the stored state of the process to the second device, wherein the previous states include the first state;

stopping the process execution on the second device;

selecting one of the one or more previous states of the process executing within the first device from the persistent store;

reconstituting the selected previous state of the process on the first device;

establishing the one or more leases to services for the process on the first device; and resuming the process execution on the first device.

3. The method of claim 1, wherein the first state of the process comprises:
 a heap for the process, wherein the heap comprises code and data for the process executing within the first device.

4. The method of claim 1, wherein the first state of the process comprises:
 data describing the one or more leases to services for the process on the first device, wherein the data describing the one or more leases is used in said establishing the one or more leases to services for the process on the second device.

5. The method of claim 1, wherein the one or more leases to services include one or more leases to remote services, wherein the remote services are services provided on devices other than the device within which the process is currently executing.

6. The method of claim 1, wherein the one or more leases to services include one or more leases to local services, wherein the local services are services provided on the device within which the process is currently executing.

7. The method of claim 1, wherein the one or more leases to services include one or more leases to system services, wherein a system service comprises system code for accessing a resource external to the process, wherein the system code is provided on the device within which the process is currently executing.

8. The method of claim 1, wherein the first state of the process comprises:
 a stored execution state of the first device;
wherein, in said reconstituting the first state of the process on the second device, a current execution state of the second device is reconstituted to the stored execution state of the first device.

9. The method of claim 1, wherein said reconstituting the first state of the process on the second device comprises:
 recalculating one or more transient variables for the process.

10. The method of claim 1, wherein the persistent store comprises one or more persistent heaps for one or more processes; and
wherein said storing the first state of the process on the first device to the persistent store comprises:
 storing the first state of the process on the first device to a first persistent heap for the process in the persistent store.

11. The method of claim 10, wherein said sending the first state of the process from the persistent store to the second device comprises:
 sending the first state of the process from the first persistent heap to the second device.

12. The method of claim 10, wherein said sending the first state of the process from the persistent store to the second device comprises:
 sending a copy of the first persistent heap to the second device;
wherein said receiving the first state of the process on the second device comprises:
 receiving the copy of the first persistent heap on the second device
and wherein said reconstituting the first state of the process on the second device comprises:
 creating a second persistent heap for the process on the second device from the received copy of the first persistent heap.

13. The method of claim 1, wherein the first device comprises a first in-memory heap for caching pages for use by the process, wherein the pages comprise code and data for the process;
wherein the persistent store comprises a first virtual heap for storing pages flushed from the first in-memory heap;
wherein said storing the first state of the process on the first device to the persistent store comprises:
 storing one or more pages from the first in-memory heap to the first virtual heap in the persistent store;
wherein said sending the first state of the process from the persistent store to the second device comprises:
 sending a copy of the first virtual heap from the persistent store to the second device.

14. The method of claim 13, wherein said reconstituting the first state of the process on the second device comprises:
 establishing on the second device a second in-memory heap for caching pages for use by the process; and
 copying the one or more pages stored from the first in-memory heap to the first virtual heap from the received copy of the first virtual heap to the second in-memory heap.

15. The method of claim 1, wherein said storing the first state of the process on the first device to the persistent store, said sending the first state of the process from the persistent store to the second device and said receiving the first state of the process on the second device are performed as elements of an atomic transaction;

the method further comprising:
committing the atomic transaction on the first device and the second device if all the elements of the atomic transaction complete successfully, wherein committing the atomic transaction comprises accepting changes to data made by the elements of the atomic transaction; and rolling back the atomic transaction if one or more of the elements of the atomic transaction fail, wherein rolling back the atomic transaction comprises restoring the data modified by the elements of the transaction to a previous state of the data prior to the start of the atomic transaction.

16. The method of claim 1,
wherein the process is executing within a first virtual machine on the first device; and
wherein said resuming the process execution on the second device comprises:
resuming the process execution on a second virtual machine on the second device.

17. The method of claim 16,
wherein the first virtual machine and the second virtual machine are Java virtual machines.

18. The method of claim 1,
wherein the persistent store is on a server external to the first device and the second device; and
wherein the first device and the second device are coupled to the server via the Internet.

19. The method of claim 1,
wherein the first device and the second device each comprise a network service connection system configured to access services by establishing leases to the services; and
wherein the one or more leases are expired on the first device and established on the second device using the network service connection system on the devices.

20. The method of claim 1,
wherein the first device and the second device each comprise a compact network service connection system configured to execute on mobile computing devices to access services by establishing leases to the services; and
wherein the one or more leases are expired on the first device and established on the second device using the compact network service connection system on the devices.

21. The method of claim 1,
wherein the first device and the second device are coupled via the Internet so that the process is migrated from the first device to the second device over the Internet.

22. The method of claim 1,
wherein the first device and the second device are network client devices.

23. The method of claim 1,
wherein at least one of the first device and the second device is a mobile computing device.

24. The method of claim 1,
wherein the process is a Java process.

25. A system for migrating a process between devices, the system comprising:
a first device configured to execute the process;
a memory coupled to the first device, wherein the memory comprises a persistent store; and
a second device;
wherein the system is configured to:
store one or more states of the process execution on the first device in the persistent store;
send a first state of the process from the persistent store to the second device;
receive on the second device the sent first state of the process from the first device;
reconstitute the received first state of the process on the second device;
establish one or more leases to services for the process on the second device; and
resume the process execution on the second device.

26. The system of claim 25,
wherein the system is further configured to:
stop the process execution on the second device;
select one of the one or more states of the process executing within the first device from the persistent store;
reconstitute the selected previous state of the process on the first device;
establish the one or more leases to services for the process on the first device; and
resume the process execution on the first device.

27. The system of claim 25,
wherein the first state of the process comprises:
a heap for the process, wherein the heap comprises code and data for the process executing within the first device.

28. The system of claim 25,
wherein the first state of the process comprises:
data describing the one or more leases to services for the process on the first device, wherein the data describing the one or more leases is used in said establishing the one or more leases to services for the process on the second device.

29. The system of claim 25,
wherein the one or more leases to services include one or more leases to remote services, wherein the remote services are services provided on devices other than the device within which the process is currently executing.

30. The system of claim 25,
wherein the one or more leases to services include one or more leases to local services, wherein the local services are services provided on the device within which the process is currently executing.

31. The system of claim 25,
wherein the one or more leases to services include one or more leases to system services, wherein a system service comprises system code for accessing a resource external to the process, wherein the system code is provided on the device within which the process is currently executing.

32. The system of claim 25,
wherein the first state of the process comprises:
a stored execution state of the first device;
wherein, in said reconstituting the first state of the process on the second device, the system is further configured to:
reconstitute a current execution state of the second device to the stored execution state of the first device.

33. The system of claim 25,
wherein, in said reconstituting the first state of the process, the system is further configured to:
recalculate one or more transient variables for the process.

34. The system of claim 25,
wherein the persistent store comprises one or more persistent heaps for the process; and
wherein the system is further configured to:
store the first state of the process execution on the first device to a first persistent heap for the process in the persistent store.

35. The system of claim 34,
wherein, in said sending the first state of the process from the persistent store to the second device, the system is further configured to:
send the first state of the process from the first persistent heap to the second device.

36. The system of claim 34,
wherein, in said sending the first state of the process from the persistent store to the second device, the system is further configured to:
send a copy of the first persistent heap to the second device;
wherein, in said receiving the first state of the process on the second device, the system is further configured to:
receive the copy of the first persistent heap on the second device
and wherein, in said reconstituting the first state of the process on the second device, the system is further configured to:
create a second persistent heap for the process on the second device from the received copy of the first persistent heap.

37. The system of claim 25,
wherein the first device comprises a first in-memory heap for caching pages for use by the process, wherein the pages comprise code and data for the process;
wherein the persistent store comprises a first virtual heap for storing pages flushed from the first in-memory heap;
wherein, in said storing the first state of the process on the first device to the persistent store, the system is further configured to:
store one or more pages from the first in-memory heap to the persistent store; and
wherein, in said sending the first state of the process from the persistent store to the second device, the system is further configured to:
send a copy of the first virtual heap from the persistent store to the second device.

38. The system of claim 37,
wherein, in said reconstituting the first state of the process on the second device, the system is further configured to:
establish on the second device a second in-memory heap for caching pages for use by the process on the second device; and
copy the one or more pages stored from the first in-memory heap to the first virtual heap from the received copy of the first virtual heap to the second in-memory heap.

39. The system of claim 25,
wherein the first device comprises a first virtual machine executable on the first device;
wherein the first virtual machine is configured to execute the process; and
wherein, in said resuming the process execution on the second device, the system is further configured to:
start execution of a second virtual machine on the second device; and
resume the process execution on the second virtual machine on the second device.

40. The system of claim 39,
wherein the first virtual machine and the second virtual machine are Java virtual machines.

41. The system of claim 25,
wherein the first device and the second device are coupled via the Internet so that the process is migrated from the first device to the second device over the Internet.

42. The system of claim 25,
wherein the first device and the second device are network client devices.

43. The system of claim 25,
wherein at least one of the first device and the second device is a mobile computing device.

44. The system of claim 25, further comprising:
a server coupled to the first device and the second device via the Internet, wherein the server comprises the persistent store.

45. The system of claim 25,
wherein the process is a Java process.

46. A computer readable medium comprising program instructions, wherein the program instructions are computer-executable to implement:
storing a first state of a process executing within a first device to a persistent store;
expiring one or more leases to services for the process on the first device;
sending the first state of the process from the persistent store to a second device;
receiving the first state of the process on the second device;
reconstituting the first state of the process on the second device;
establishing the one or more leases to services for the process on the second device; and
resuming the process execution on the second device.

47. The computer readable medium of claim 46, wherein the program instructions are further computer-executable to implement:
storing one or more previous states of the process executing within the first device to the persistent store prior to said sending the stored state of the process to the second device, wherein the previous states include the first state;
stopping the process execution on the second device;
selecting one of the one or more previous states of the process executing within the first device from the persistent store;
reconstituting the selected previous state of the process on the first device;
establishing the one or more leases to services for the process on the first device; and
resuming the process execution on the first device.

48. The computer readable medium of claim 46,
wherein the first state of the process comprises:
a heap for the process, wherein the heap comprises code and data for the process executing within the first device.

49. The computer readable medium of claim 46,
wherein the first state of the process comprises:
data describing the one or more leases to services for the process on the first device, wherein the data describing the one or more leases is used in said establishing the one or more leases to services for the process on the second device.

50. The computer readable medium of claim 46,
wherein the one or more leases to services include one or more leases to remote services, wherein the remote services are services provided on devices other than the device within which the process is currently executing.

51. The computer readable medium of claim 46,
wherein the one or more leases to services include one or more leases to local services, wherein the local services are services provided on the device within which the process is currently executing.

52. The computer readable medium of claim 46,
wherein the one or more leases to services include one or more leases to system services, wherein a system service comprises system code for accessing a resource external to the process, wherein the system code is provided on the device within which the process is currently executing.

53. The computer readable medium of claim 46,
wherein the first state of the process comprises:
a stored execution state of the first device;
wherein, in said reconstituting the first state of the process on the second device, the program instructions are further computer-executable to implement:
reconstituting a current execution state of the second device to the stored execution state of the first device.

54. The computer readable medium of claim 46,
wherein the first device comprises a first in-memory heap for caching pages for use by the process, wherein the pages comprise code and data for the process;
wherein the persistent store comprises a first virtual heap for storing pages flushed from the first in-memory heap;
wherein, in said storing the first state of the process on the first device to the persistent store, the program instructions are further computer-executable to implement:
storing one or more pages from the first in-memory heap to the first virtual heap in the persistent store; and
wherein, in said sending the first state of the process from the persistent store to the second device, the program instructions are further computer-executable to implement:
sending a copy of the first virtual heap from the persistent store to the second device.

55. The computer readable medium of claim 54,
wherein, in said reconstituting the first state of the process on the second device, the program instructions are further computer-executable to implement:
establishing on the second device a second in-memory heap for caching pages for use by the process; and
copying the one or more pages stored from the first in-memory heap to the first virtual heap from the received copy of the first virtual heap to the second in-memory heap.

* * * * *